US011636213B1

(12) United States Patent
Elgressy et al.

(10) Patent No.: US 11,636,213 B1
(45) Date of Patent: Apr. 25, 2023

(54) SYSTEM AND METHODS FOR REDUCING AN ORGANIZATION'S CYBERSECURITY RISK BASED ON MODELING AND SEGMENTATION OF EMPLOYEES

(71) Applicant: Proofpoint, Inc., Sunnyvale, CA (US)

(72) Inventors: Doron Asher Elgressy, Ceasarea (IL); David Robert Knight, Los Altos, CA (US); Arthur Zavalkovsky, Netanya (IL)

(73) Assignee: Proofpoint, Inc., Sunnyvale, CA (US)

( * ) Notice: Subject to any disclaimer, the term of this patent is extended or adjusted under 35 U.S.C. 154(b) by 328 days.

(21) Appl. No.: 16/935,636

(22) Filed: Jul. 22, 2020

Related U.S. Application Data

(60) Provisional application No. 62/945,465, filed on Dec. 9, 2019.

(51) Int. Cl.
| | | |
|---|---|---|
| *G06F 21/57* | (2013.01) | |
| *H04L 9/40* | (2022.01) | |
| *G06N 20/00* | (2019.01) | |
| *G06Q 10/0635* | (2023.01) | |
| *G06Q 10/105* | (2023.01) | |
| *G06N 5/04* | (2023.01) | |
| *G06Q 50/26* | (2012.01) | |

(52) U.S. Cl.
CPC ............ *G06F 21/577* (2013.01); *G06N 5/04* (2013.01); *G06N 20/00* (2019.01); *G06Q 10/0635* (2013.01); *G06Q 10/105* (2013.01); *H04L 63/0263* (2013.01); *H04L 63/10* (2013.01); *G06F 2221/034* (2013.01); *G06Q 50/265* (2013.01)

(58) Field of Classification Search
CPC ... G06F 21/577; G06F 2221/034; G06N 5/04; G06N 20/00; G06Q 10/0635; G06Q 10/105; G06Q 50/265; H04L 63/0263; H04L 63/10
See application file for complete search history.

(56) References Cited

U.S. PATENT DOCUMENTS

| | | | | |
|---|---|---|---|---|
| 7,606,783 | B1 * | 10/2009 | Carter | G06Q 10/00 706/50 |
| 2016/0112451 | A1 * | 4/2016 | Jevans | G06F 21/56 726/25 |
| 2017/0091968 | A1 * | 3/2017 | George | G06T 11/206 |
| 2017/0244746 | A1 * | 8/2017 | Hawthorn | H04L 63/1408 |

* cited by examiner

*Primary Examiner* — J. Brant Murphy
(74) *Attorney, Agent, or Firm* — FisherBroyles LLP; Alan D. Minsk

(57) ABSTRACT

Systems, apparatuses, and methods for more effectively preparing for and responding to cybersecurity threats directed at people or at groups of people. A segmentation process is described that evaluates multiple characteristics of a person that may make them a potential target or that may make a cybersecurity attack on that person more likely to be successful. Based on the segmentation, a security analyst can apply an appropriate risk reduction or security protocol to each person or group of similarly situated people to reduce the likelihood of an attack and/or the likelihood of a successful attack.

20 Claims, 19 Drawing Sheets

People Risk Posture Analysis

- Risk factors presentation and analysis
- Drill down to Specific Risk factor
- Starting point for Risk forensics
- Data sources:
  – Proofpoint Products
  – Industry average
  – 3rd party products

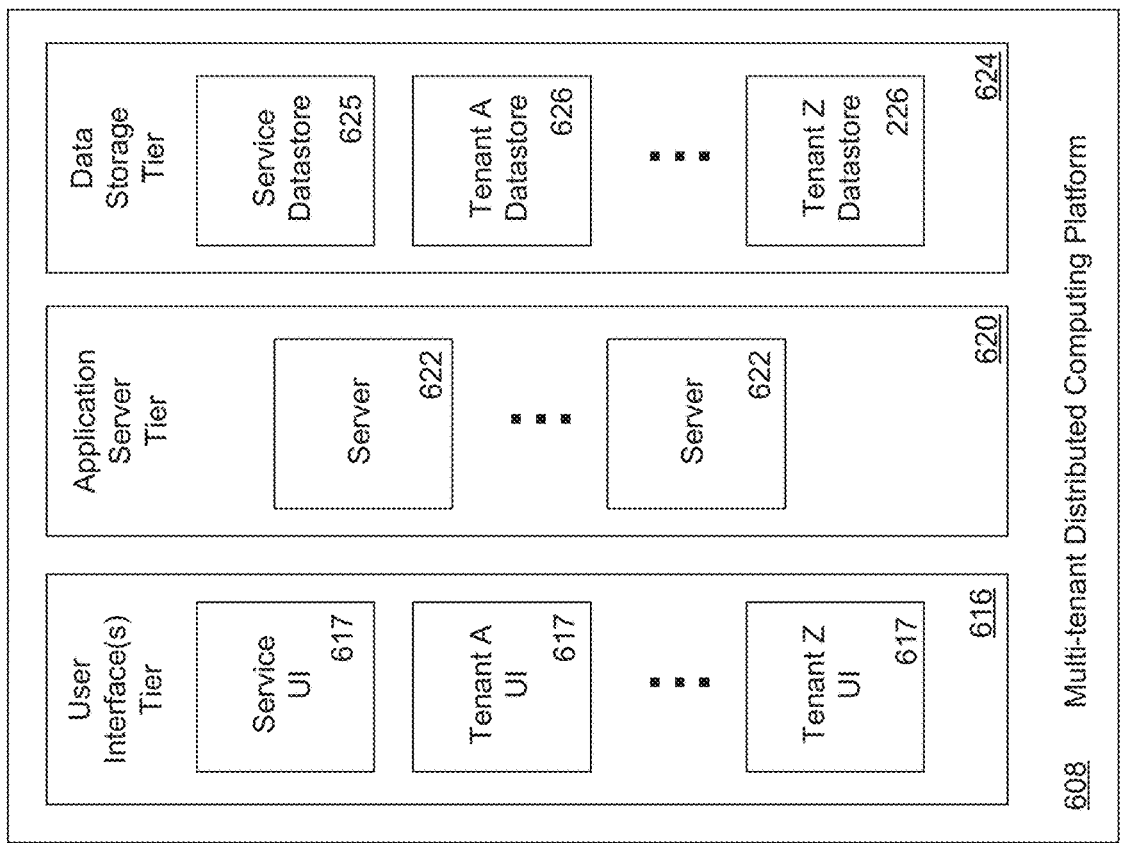
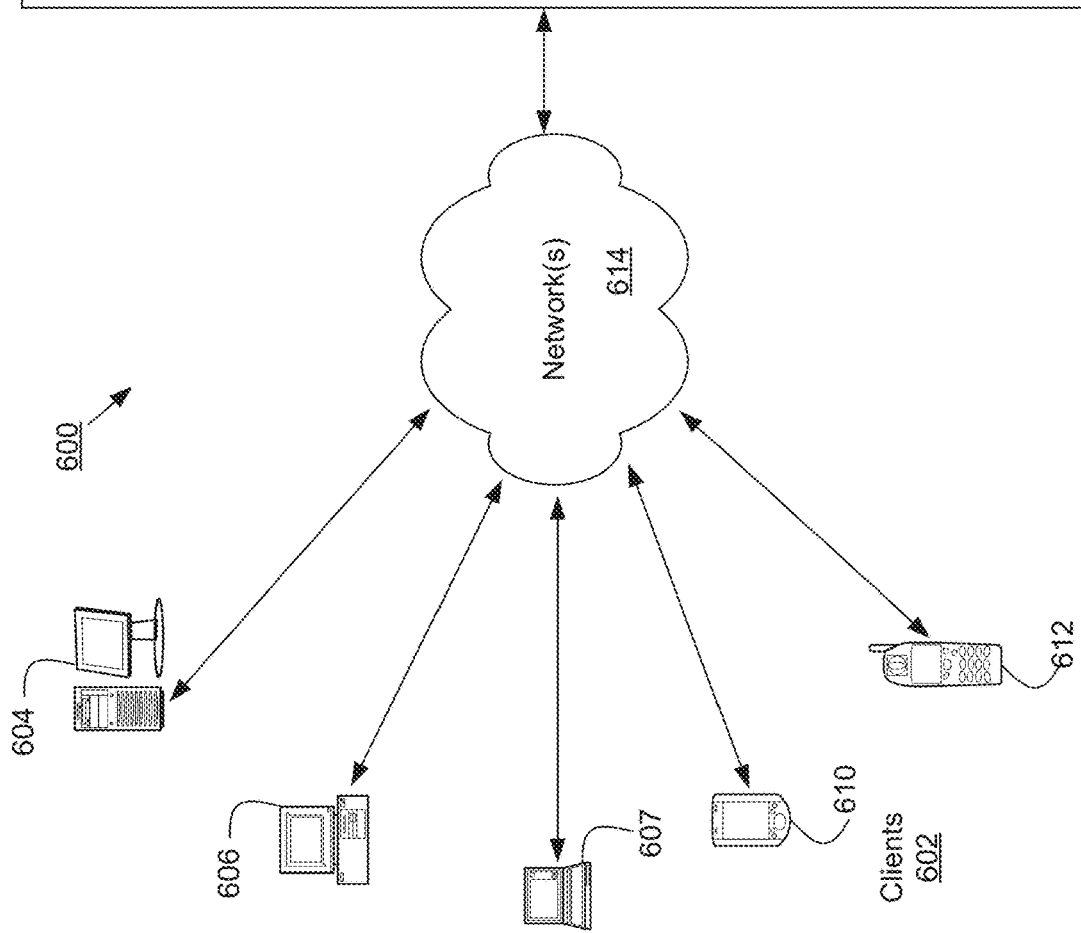
Figure 6

| # | Node (attribute) name | Is leaf | Calculation/ aggregation type | Available values (0 – Max Theoretical Risk) | Residual Risk |
|---|---|---|---|---|---|
| | Privileged_SensitiveSystems_Roles_ApplicationAdmin | True | Latest value | 0 = False<br>6 = True | - |
| | Privileged_BusinessAuthority_VIP | True | Latest value | 0 = False<br>6 = True | - |
| | Privileged_PeopleManager | True | Latest value | 0,2 | - |
| | Privileged_BusinessFunctions | True | Latest value | Finance = 6.0<br>Legal= 6.0<br>HR= 6.0<br>IT= 6.0<br>Bizdev = 4<br>Technology = 4<br>Purchasing = 4<br>Operations = 3<br>Sales = 3<br>Support = 3<br>Compliance = 1<br>Marketing = 1<br>Product = 1<br>Administration = 1<br>PublicSafety = 1<br>Other = 1 | - |
| | Privileged_BusinessAuthority_Seniority | True | Latest value | Executive = 7<br>VP = 6<br>Director = 3<br>Manager = 2<br>Employee =1<br>Temp = 1<br>Contractor = 1<br>Other = 1 | - |
| | Privileged | False | Node Risk | 0-10 | - |
| | Vulnerable_BehaveAware_EmailSecurity_IntroToPhishing | True | Latest value | 0,4 | 4 |
| | Vulnerable_BehaveAware_EmailSecurity_AvoidDangAttachments | True | Latest value | 0,4 | 4 |
| | Vulnerable_BehaveAware_EmailSecurity_AvoidDangLinks | True | Latest value | 0,4 | 4 |
| | Vulnerable_BehaveAware_EmailSecurity | False | Node Risk | 0-10 | - |
| | Vulnerable_BehaveAware_PhishingSimulation | True | Latest value | 0 = False<br>6 = True | 3 |
| | Vulnerable_BehaveAware_IdentityProtection_MFA | True | Latest value | 0 = False<br>3 = True | 3 |
| | Vulnerable_BehaveAware_IdentityProtection_PasswordManagement | True | Latest value | 0 = False<br>3 = True | 3 |
| | Vulnerable_BehaveAware_IdentityProtection_PasswordPolicy | True | Latest value | 0 = False<br>3 = True | 3 |
| | Vulnerable_BehaveAware_IdentityProtection_IdentComprAccounts | True | Latest value | 0 = False<br>3 = True | 3 |
| | Vulnerable_BehaveAware_IdentityProtection | False | Node Risk | 0-10 | - |
| | Vulnerable_BehaveAware_SafeBrowsing_SaferWebBrowsing | True | Latest value | 0 = False<br>3 = True | 3 |
| | Vulnerable_BehaveAware_SafeBrowsing_URLTraining | True | Latest value | 0 = False<br>3 = True | 3 |
| | Vulnerable_BehaveAware_SafeBrowsing_SafeSocialNet | True | Latest value | 0 = False<br>3 = True | 3 |
| | Vulnerable_BehaveAware_SafeBrowsing | False | Node Risk | 0-10 | - |
| | Vulnerable_BehaveAware | False | Node Risk | 0-10 | - |
| | Vulnerable_Environment_Network_TOR | True | Latest value | 0 = False<br>7 = True | - |
| | Vulnerable_Environment_Network_VPN | True | Latest value | 0 = False<br>7 = True | - |
| | Vulnerable_Environment_Network | False | Node Risk | 0-10 | - |
| | Vulnerable_Environment_Location | True | Latest value | 0 = False<br>5 = True | - |
| | Vulnerable_Environment | False | Node Risk | 0-10 | - |
| | Vulnerable_Identity_PasswordExpirationPolicies | True | Latest value | 0 = False<br>3 = True | - |
| | Vulnerable_Behaviour_UsagePattern_Clickers | True | Sum | 0 = 0 clicks<br>6 = at least one click | 2 |
| | Vulnerable_Behaviour_UsagePattern | False | Node Risk | 0-10 | - |
| | Vulnerable_Behaviour | False | Node Risk | 0-10 | - |
| | Vulnerable | False | Node Risk | 0-10 | - |

Figure11

SYSTEM AND METHODS FOR REDUCING AN ORGANIZATION'S CYBERSECURITY RISK BASED ON MODELING AND SEGMENTATION OF EMPLOYEES

CROSS REFERENCE TO RELATED APPLICATION

This application claims the benefit of U.S. Provisional Application No. 62/945,465, entitled "Systems and Methods for Modeling and Segmentation of People Oriented Risk in Cybersecurity Application," filed Dec. 9, 2019, the disclosure of which is incorporated, in its entirety (including the Appendix), by this reference.

BACKGROUND

Cybersecurity (also sometimes referred to as computer security or information technology (IT) security) relates to the protection of computer systems, computing devices, and networks from the theft of, or damage to, hardware, software, or electronic data, as well as from the disruption or misdirection of the services they provide. The data may include proprietary information, payment information, or personal information, and may be of interest to foreign state actors, competitors, or those seeking to commit fraud via identify theft.

While personal computing devices and servers located behind firewalls were formerly the primary "targets" of malicious actors, with the development and acceptance of "cloud-based" services, the set of targets has now expanded to include networks and remotely located servers used as part of a Software-as-a-Service platform. These remote servers are connected by one or more networks (e.g., wired, wireless, dedicated, etc.) to users who access data stored remotely or add data to remotely located data storage components. Users may also instruct processors in the servers to perform specified operations on the data. Over time, the combination of a greater number of users, greater amounts of potentially valuable data and information, and an increase in the potential entry points for a malicious actor have contributed to an increased cybersecurity threat. This increased threat or degree of cybersecurity risk has been responded to with the conventional tools available to security/IT analysts, where these tools are those associated with detecting and responding to threats that could result in unauthorized access to, or disruption of, IT assets, such as computers, servers, or networks. However, these conventional tools are of limited value in addressing cybersecurity risks in the changing threat environment and when addressing threats to the increased types and numbers of potential targets.

Conventional approaches and tools used to respond to and address the changes in the cybersecurity threat landscape suffer from one or more disadvantages. These include an inability to alter security protocols based on the behavior or situation of individual users, a need to expend a large amount of IT or security personnel time and resources on device-specific installations and updates, and in general, being based on a highly non-granular approach to providing security. These limitations of conventional approaches and tools become even more problematic in view of the expansion of cybersecurity attacks to include specific people or groups, as well as networks and remote servers or other infrastructure.

Systems and methods are needed for more efficiently and effectively responding to the recent changes in the cybersecurity threat landscape. Embodiments of the inventions described herein are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms do not to limit the subject matter described herein or the meaning or scope of the claims. Embodiments of the disclosure are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

In recent years, the cybersecurity threat landscape has shifted from malicious actors targeting IT infrastructure (such as networks, servers, and computing devices) to actors targeting people who are users of devices, networks, and applications. One reason for this is that malicious actors have realized that some people are more likely to serve as an entry point for an attack on a system or network, or to provide access to other targets of interest. By focusing on specific people instead of a large number of devices, a malicious actor can sometimes improve their chances of obtaining access to the information they are interested in obtaining.

One goal of the approach of targeting users or groups of users is to leverage weaknesses in their behavior and hopefully trick them into exposing their credentials, thereby gaining access to data, email accounts, systems, cloud applications, servers, and networks of potential value to a malicious actor. Malicious actors also hope to leverage a user's identity and credentials to obtain access to other people, accounts, and IT assets within an organization.

While some malicious actors may still initiate broad-scale attacks on a large number of people because such attacks have a low, but still acceptable probability of being successful, in recent years actors have chosen to apply a more selective targeting approach. This more selective approach may include performing prior research on potentially valuable targets, including people having access to proprietary data and systems and/or those whose behavior suggests they are more likely to provide access to valuable data, and then initiating a highly customized attack on a target.

These types of customized attacks may be viewed as based on characteristics of a person that make them more likely to be a target of an attack and/or that make an attack more likely to be successful. As a result, cybersecurity teams are now facing a new "people" focused attack vector and would benefit from tools and approaches that can help them to cope with this growing problem. Among other benefits, embodiments of the system and methods described herein provide such tools and approaches and can assist an IT or cybersecurity professional to more effectively identify people or groups at higher risk from such customized, people-oriented attacks.

As will be described, in some embodiments, this may be accomplished by a segmentation process that evaluates multiple characteristics of a person that may make them a potential target or that may make an attack on that person more likely to be successful. Based on the segmentation, embodiments then recommend or allow a security analyst to apply an appropriate risk reduction or security protocol to each person or group of similarly situated people to reduce the likelihood of an attack and/or the likelihood of a successful attack.

As mentioned, conventional approaches and tools for addressing device-based cybersecurity threats have significant limitations and disadvantages when used to confront threats targeted at people or groups of people. These limitations of conventional approaches include:

the difficulty in obtaining a comprehensive picture of cybersecurity, which combines multiple types of threats such as email related threats, cloud-based accounts and data, networks, etc.;

conventional methods protect assets (i.e., physical or virtual devices and networks) rather than people, and are not applicable to monitoring and protecting such a large number of potential targets or objects (this is at least partly because the number of users is much higher than the number of assets);

conventional methods do not consider non-threat related user characteristics that might influence security, such as user seniority, business function, personal behavior, department, etc.; and conventional methods do not include an effective mechanism for tracking progress and comparing the security status of an organization to that of other organizations as a way of benchmarking or evaluating the security efforts of the organization.

Embodiments of the disclosure are directed to systems, apparatuses, and methods for more effectively preparing for and responding to cybersecurity threats directed at people or at groups of people. In some embodiments, this is achieved by adopting a perspective on the security function that is people-centric instead of the conventional device-centric approach. This change in perspective leads to developing techniques to identify users most likely to be a target and/or thought to be most susceptible to a malicious attack and providing a security/IT team with tools to understand and manage possible threats to these users.

In some embodiments, each user is characterized by being placed or segmented into one or more specific groups or classifications. In some embodiments, these groups include the group of Attacked People (AP), the group of Vulnerable People (VP), or the group of Privileged People (PP). Based on a threshold value that may be adjusted within each of these groups, some users may be classified into a sub-group of people with a relatively higher risk in each group.

These sub-groups are classified as the subset groups of Very Attacked People (VAP), Very Vulnerable People (VVP), and Very Privileged People (VPP). In some embodiments, intersections of these subset(s) identify sub-groups at different levels or types of risk. These intersection sub-groups are defined as Imminent Targets (IT, where IT=VAP+VVP+VPP), Major Targets (MT=VAP+VPP), Latent Targets (LT=VPP+VVP) and Soft Targets (ST=VVP+VAP).

Based on the segmentation of a specific user into a group (AP, VP, or PP), and if desired on further segmentation as belonging or not belonging to a sub-group of VAP, VVP, or VPP, and then further segmentation as belonging or not belonging to an intersection of these sub-groups, a cybersecurity procedure can be applied or developed that is specific to the user and to others in each sub-group or intersection of sub-groups. This cybersecurity procedure can efficiently address the user's characteristics that make them more likely to be a target of an attack and/or more susceptible to an attack being successful. The people-centric approach described herein can also provide an IT or security analyst with a set of tools to understand the security status of an organization as a whole, and thereby better prepare users to prevent a successful attack, while enabling a more effective response should an attack occur.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIGS. 5-7 are diagrams illustrating an architecture for a multi-tenant or SaaS platform that may be used in implementing embodiments of the systems and methods described herein;

FIG. 11 is a table illustrating an example of a risk tree node description; and

Note that the same numbers are used throughout the disclosure and figures to reference like components and features.

DETAILED DESCRIPTION

Figure 1A:
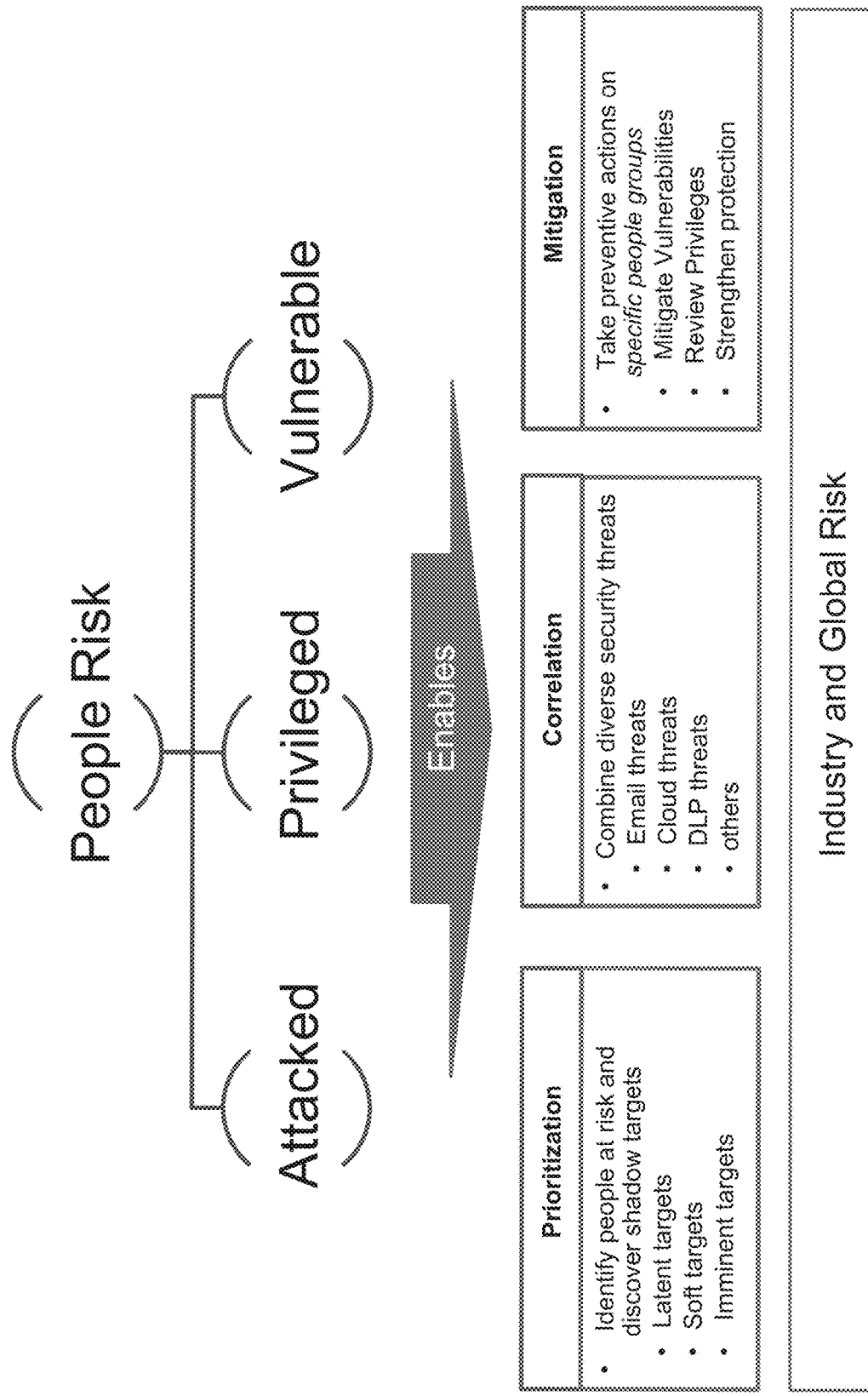
FIG. 1(a) is a diagram illustrating certain primary aspects of an effective people-centric approach to cybersecurity, in accordance with embodiments of the systems and methods described herein.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosed systems and methods may be practiced. The disclosed systems and methods may, however, be embodied in different forms and should not be construed as limited to the embodiments set forth herein; rather, these embodiments are provided so that this disclosure will satisfy the statutory requirements and convey the scope of the disclosed invention(s) to those skilled in the art.

Among other things, the embodiments of the disclosure may be implemented in whole or in part as a system or systems, as one or more methods, or as one or more devices.

Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), or other form of computing or data processing system, device, or platform.

The processing element or elements may be programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the systems, apparatuses, and methods disclosed herein are directed to implementations of an approach and techniques for more effectively preparing for and responding to cybersecurity threats directed at people or at groups of people. In some embodiments, this is achieved by adopting a perspective on the security function that is people-centric instead of the conventional device-centric approach. This change in perspective leads to developing techniques to identify users most likely to be a target and/or thought to be most susceptible to a malicious attack and providing a security/IT team with tools to understand and manage possible threats to these users.

As noted, malicious actors have begun applying a more selective approach to identifying potential targets for a cybersecurity attack. This more selective approach may include researching potentially valuable targets, including people having access to proprietary data and systems and/or those whose behavior suggests they are more likely to provide access to valuable data, and then initiating a highly customized attack on a target. These customized attacks may be based on, or attempt to take advantage of, characteristics of a person that make them more likely to be a target of an attack and/or that make an attack more likely to be successful (for example, as a result of a person's response to a simulated cybersecurity attack).

Among other benefits, embodiments of the systems and methods described herein provide tools and approaches that can assist an IT or cybersecurity professional to more effectively identify people or groups at higher risk from such customized, people-oriented attacks. Based on identifying these people or groups, a specific security protocol or procedure can be applied to those people or groups, where the security protocol or procedure may be directed at assisting in preventing an attack or limiting the potential harm from an attack.

Identifying which people or group of people in an organization are at a higher risk for being the subject of a cybersecurity attack, or more likely to be the subject of a successful attack, and focusing resources on protecting those users is of high value (and a correspondingly high return on investment) to cybersecurity teams. In addition to identifying and protecting those users, embodiments can also provide ways to prevent those people or groups from being the subject of an attack, or at least reduce the possibility of an attack. This can be done by applying constraints on how those users access proprietary data, how they connect to the network, websites they may visit using the company network, etc.

As an example, highly attacked people, highly privileged people (e.g., people expected to have access to important information, networks, and systems containing important information, or to others in an organization, such as CEOs, CFOs, and GCs) and highly vulnerable people (those with a history or indication of being more susceptible to an attack, or who engage in conduct that represents vulnerable behavior) introduce higher risk of being the subject of an attack or of a successful attack. As a result, they should be subject to increased scrutiny and the application of appropriate security procedures by a security team, where the security procedure applied to each of the groups may specifically address why they are a potential target of an attack.

Further, in larger organizations, focusing solely on individuals and their devices, or applying security measures across an entire organization are not effective or efficient operational practices. Instead, segmenting people into groups with different types and levels of cybersecurity related risks (while also identifying reasons that make members of the group a worthwhile target and/or susceptible to an attack), and in response providing appropriate risk management and training resources to each segment is a more effective approach and also a more efficient allocation of resources for addressing cybersecurity risk.

Thus, while conventional cyber/information security risk management approaches and tools focus on measurement of risk associated with IT assets, the concept of "people centric risk" as described herein provides a measure of the cybersecurity risk a person or similarly situated group of people introduce to an organization. In some embodiments, this is accomplished by considering risk models and risk evaluation techniques that are customized to reflect how people as a vector fit into the traditional cybersecurity landscape.

At a high level, embodiments of the system and methods described herein provide a cybersecurity team with techniques to segment people into different groups corresponding to different levels and types of risk—this process is termed "People Risk Segmentation (PRS)" herein. In one embodiment, these groups may include people that belong to one or more of a group of Attacked People (AP), Vulnerable People (VP), and Privileged People (PP). A risk score, metric, or level may be associated with each member of each group. The risk score, metric, or level may be a result of combining other scores, metrics, or levels obtained from an evaluation of factors that impact a person's likelihood of being attacked or of an attack being successful.

The factors evaluated, and the higher-level groups or categories are believed to be of significance for purposes of analysis and mitigating people-centric risk. The scores and assignment to a higher-level group can be used to sort a set of people, where the factors may suggest a person's likelihood of being a target of an attack (e.g., their previous history of being attacked and/or their access to potentially valuable information) and/or the likelihood of an attack being successful (e.g., based on their behavior or cybersecurity training experience).

In some embodiments, the definition of these groups may be as follows:
  AP (attacked people)—people previously subjected to a cybersecurity attack, i.e., the target(s) of an attack;
  VP (vulnerable people)—people whose behavior increases a chance of account take over or other harm (such as identify theft) in a case of an attack (e.g., people who click on the links within phishing emails or who have not completed some aspect of cybersecurity training); and
  PP (privileged people)—people who have access to confidential information/systems within an organization and hence may provide entry points to data and systems of interest to malicious actors (e.g., finance, legal departments, sales, R&D, etc.). Such people generally include executives, project managers, people having access to valuable financial or technical data, etc.

Note that members of each of these groups may have specific characteristics or behaviors that make them a relatively more or less significant target for an attack.

Identifying and focusing on people with a relatively higher risk in each group provides subset groups of Very Attacked People (VAP), Very Vulnerable People (VVP), and Very Privileged People (VPP). These sub-groups may be identified by determining which group members have a profile, history, or behavior that causes them to exceed a predetermined (and in some examples, adjustable) threshold or level for one or more of a group's characteristics.

In some embodiments, the intersections of these sub-groups or subset(s) identify targets or sets of people at risk, with some at greater risk, or at greater risk from a specific type of attack. In some embodiments, these intersections are defined as: Imminent Targets (IT=VAP+VVP+VPP), Major Targets (MT=VAP+VPP), Latent Targets (LT=VPP+VVP) and Soft Targets (ST=VVP+VAP). Although risk prevention or reduction procedures can be applied to people in different groups (AP, VP, PP) or sub-groups (VAP, VVP, VPP), these sub-group intersections of people at relatively higher levels of risk or at greater risk from a specific type of attack can be the subject of (or basis for) specific risk control actions, training, interventions, monitoring, more immediate action, etc.

Segmenting the people in an organization into the groups, sub-groups and intersections of sub-groups (and hence into target types or profiles) described herein may provide a cybersecurity team with one or more of the following benefits:
  The ability to associate people in an organization with their relative degree of risk, and in response to prioritize the application of cybersecurity prevention and remediation services;
  The ability to correlate different security threats and modes of attack to obtain a fuller picture of the cybersecurity threat to an organization; and
  The ability to take person or group-specific actions to reduce the likelihood of a successful cybersecurity attack and take proactive steps to prevent further attacks.

Embodiments of the systems and methods described herein define/construct these dynamic groups of people and use the segmentation to reduce the cybersecurity risk of an organization. In some examples, this is done in part by creating thresholds for belonging to or membership in each core group, sub-group and the sub-group(s) derived from the noted intersections. For example, if a person has been attacked at least once in a recent week, he/she may be placed into the Attacked People (AP) group. If such a person has an attack risk score higher than 8 (out of 10) or is among the top 10% of people being attacked (or has been evaluated by another method used to describe a magnitude or risk of a set of attacked people), he/she may be placed into the Very Attacked People (VAP) group.

As a further example, if a person assigned to the VAP sub-group is identified as having (or having had or likely to have) access to sensitive corporate information, then he/she will likely be identified as a highly privileged person and be added to the Very Privileged People (VPP) group. Since he/she is now a member of both the VAP and VPP groups (but not part of VVP), he/she may be added to the Major Targets (MT) intersection group. As this example demonstrates, the group or risk profile for a specific user is a dynamic aspect of that person, including their behavior and role, and events that occur over a relevant timeframe.

As used herein, the term "dynamic" as used with reference to the membership of a person, group, sub-group, or target type refers to the characteristic that the members of a group, sub-group, or target type, or the category a person is placed into, are not fixed and may change over time. Such changes can be due to a change in a person's function within an organization, a task they are assigned or have completed, a change to a threshold for "membership" in a group or sub-group, a time period over which certain events are counted, a change in a person's behavior, etc.

As used herein, the term or phrase "risk event" refers to an event or occurrence that may be an indication of, or related to, a cybersecurity attack or threat. Examples include, but are not limited to a communication, a message, an attempt at connecting to a network, an attempted download, an attempt at changing a configuration of a system or device, an unexpected change to data, an unexpected delay in responding to a request for data, etc. A risk event is typically associated with a cybersecurity attack or attempted attack and results in a security product generating a signal and/or data indicating the event occurred and, in some cases, characterizing aspects of the event.

As used herein, the term or phrase "characteristic(s) of a risk event" refers to data or information regarding a risk event that may be used as part of assessing the cybersecurity risk associated with the event or more generally characterizing the event. Examples include, but are not limited to data or information regarding sources of an event, methods used in an attempted cybersecurity attack or threat, the timing of an event, attachments to a message used in an event, techniques used to attempt to obtain access to data, devices, or networks, etc.

As used herein, the terms or phrases "risk characteristic(s) of an individual", "risk factors of an individual", or "risk attributes of an individual" refers to aspects of an individual or their behavior that factor into assessing the cybersecurity risk they pose to an organization. Examples include, but are not limited to the person's position within an organization, their business function, their ability to access to proprietary data or networks, their responses to simulated cybersecurity attacks, their previous history of being the subject of an attack, their on-line presence, their accessing of specific websites or use of specific applications, etc.

As used herein, the term or phrase "cybersecurity risk" or "risk"" refers to a measure of the likelihood of a person, employee, group, sub-group, target type, or organization being the target of a cybersecurity attack or of the likelihood of an attack being successful. It may also refer to a measure of the potential damage to the organization if the user's account is compromised.

In some examples, the attack may be intended to obtain unauthorized access to data or information, to devices, to networks, or to systems. In one example, an attack may be in the form of an attempt to obtain a person's credentials, such as username and password. The cybersecurity risk or risk may be expressed in any suitable manner, including, but not limited to a score, a range of scores, a descriptive level or degree, an indication of inclusion in a specific risk category or group, etc.

Note that in some embodiments, the group membership or entry thresholds (i.e., the value or values of specific characteristics, metrics, or parameters that cause a person having those characteristics, metrics, or parameters to be placed into a group or sub-group) may be dynamic, varying over time, or customized per organization or per industry. This facilitates a more realistic comparison of one organization to another in the same or similar industry. In addition, embodiments enable a cybersecurity team to review and investigate the data and obtain or generate an analysis of the attributes and calculations used to determine the risk score or category determined for a person or group.

Figure 1B:
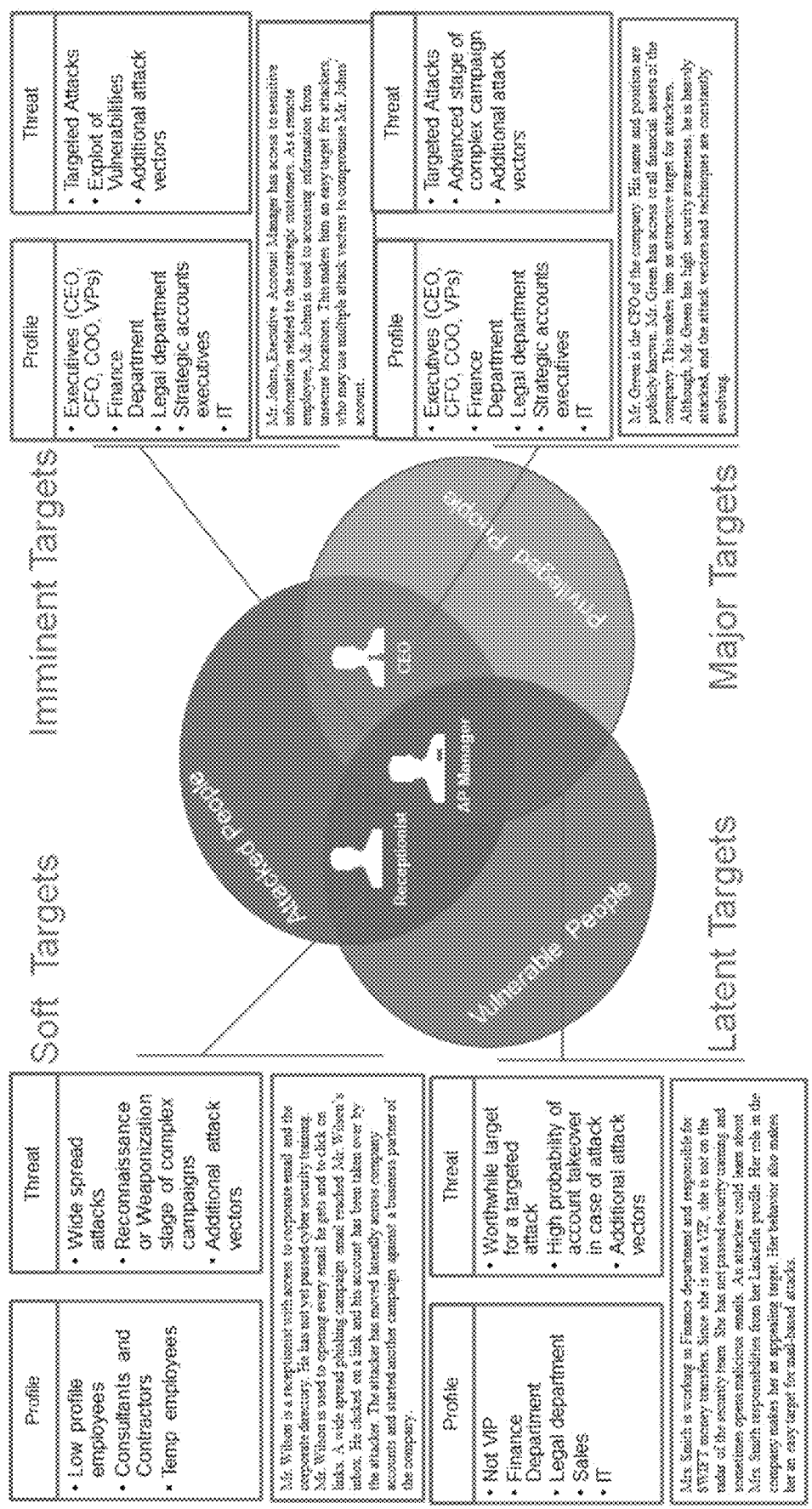
FIG. 1(b) is a diagram illustrating an example of how a group of people in an organization may be segmented into groups, sub-groups, and target type, in accordance with embodiments of the systems and methods described herein.
Figure 1C:
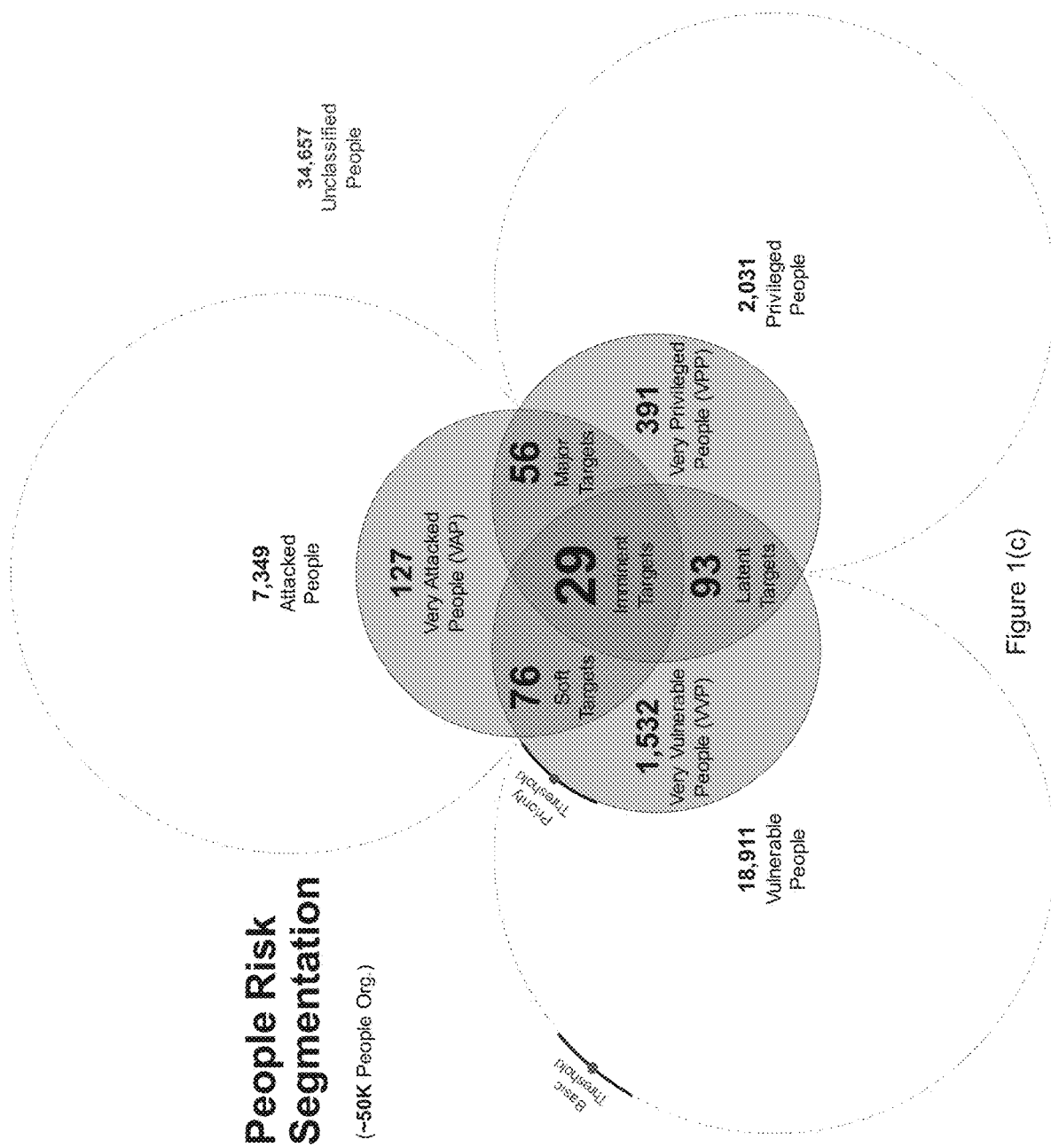
FIG. 1(c) is a diagram illustrating an example of how the members of an organization may be segmented into groups more or less likely to be the target of a cybersecurity attack or of a successful attack, and hence to present a risk based on (a) a general attribute of being privileged, vulnerable, or attacked, (b) belonging to a sub-group considered to be a higher risk member of the group having the general attribute and (c) belonging to an intersection of one or more of the sub-groups, in accordance with embodiments of the systems and methods described herein.

As an example, a cybersecurity analyst may iteratively adjust or modify a threshold value (such as that indicated by "basic threshold" or "priority threshold" in FIG. 1(c)) for membership in a group or category as part of a process to vary the number of members in a group or category. This may be done to initially focus risk control efforts on a smaller group of those representing the greatest risk (such as by setting stricter or higher threshold levels), followed by expanding those efforts to a larger set of people at a lower risk or who present a lower potential risk (by setting less strict or lower threshold levels). An analyst can vary the thresholds over time or in response to security related developments in order to identify and address the risk associated with a smaller or larger number of people in an organization. With regards to industry-specific thresholds, a "standard" threshold level may be applied for an industry to permit analysts to compare their organization to another in the same or similar industry. This can be useful as industries may have differences in risk tolerance or risk exposure. Over time, analysis of risk events across different industries may provide insights into how to set the standard threshold for an industry at an appropriate level.

In some embodiments, a machine learning model (ML) may be trained and used in a process to evaluate one or more contributions to the cybersecurity risk of a person, user, group, sub-group, etc. In some examples, the trained model may operate to assign a score, metric, label, level or other indicator of risk or relative risk to a person based on one or more attributes or risk characteristic(s) of the person. Such attributes may include but are not limited to factors that are relevant to the likelihood of the person being attacked or to the likelihood of an attack being successful.

For example, a person's risk attributes or risk characteristics may include one or more of job title, role, previous cybersecurity training and results, the person's use of certain applications or services, the person's previous history of being the target of a cybersecurity attack, the person's behavior when confronted with an attack, etc. In some examples, more than one trained model may be used, with each model generating a score, metric, or level that is then normalized (if needed) and combined to produce an overall risk score or evaluation, and/or to allow the person to be assigned or segmented into a risk group, sub-group, etc.

In one example, a model is trained using a set of training data that may include labeled/annotated security events (i.e., incidences of attempted attacks or potentially malicious behavior as detected by security monitoring applications or services), and static and dynamic user information (such as a person's job title, role, previous behavior in response to an attack, etc.). As will be described with reference to the risk modeling tree of FIG. 2(c), in some embodiments a trained machine learning model may be used to generate a score, metric, level, etc. for one or more "leaves" or nodes of the tree, with the model outputs for the leaves then combined to produce a more comprehensive risk evaluation for a person, group, sub-group, etc.

In some embodiments, after training, a model or a combination of models (with or without other information) may operate to assign a person to one or more categories of risk (such as the previously mentioned (AP, VP, PP) or (VAP, VVP, VPP) categories). In addition, or instead the model(s) may operate to assign a risk score or metric to a person, with the score or metric able to be mapped or converted to a risk segment or category. In some embodiments, the model(s) may also generate as an output a measure or confidence level regarding the generated score, metric, or classification of the person. In some embodiments, the trained model(s) may generate more than one possible score, metric, or classification, each with an associated confidence level. The overall risk for a group or organization may be calculated based on a combination of the risks for each person in the group or organization using a customizable function (e.g., a weighted average of Attacked, Vulnerable and Privileged risks). One example of a calculation of an overall risk score for a person is described in the Appendix to this application. The overall risk scores for a group of people may then be combined (using the same or a similar method as used for a person) to determine a risk score for an organization as a whole.

As mentioned, in determining the overall risk score for an organization, the risk scores for the individuals in the organization may be combined in one of several ways. The specific combination method selected may depend on whether it is desired to give greater weight to relatively higher sources of risk. For example, the customizable function may be selected to apply a weighted average to reflect the average risk to the organization. Similarly, the function may select the highest risk to identify "hidden" risks in lower levels. Further, the function may be selected to use an exponential weighting function that provides additional weight to the higher risk numbers and operates to reduce the impact of low/less relevant risk levels.

Figure 2A:
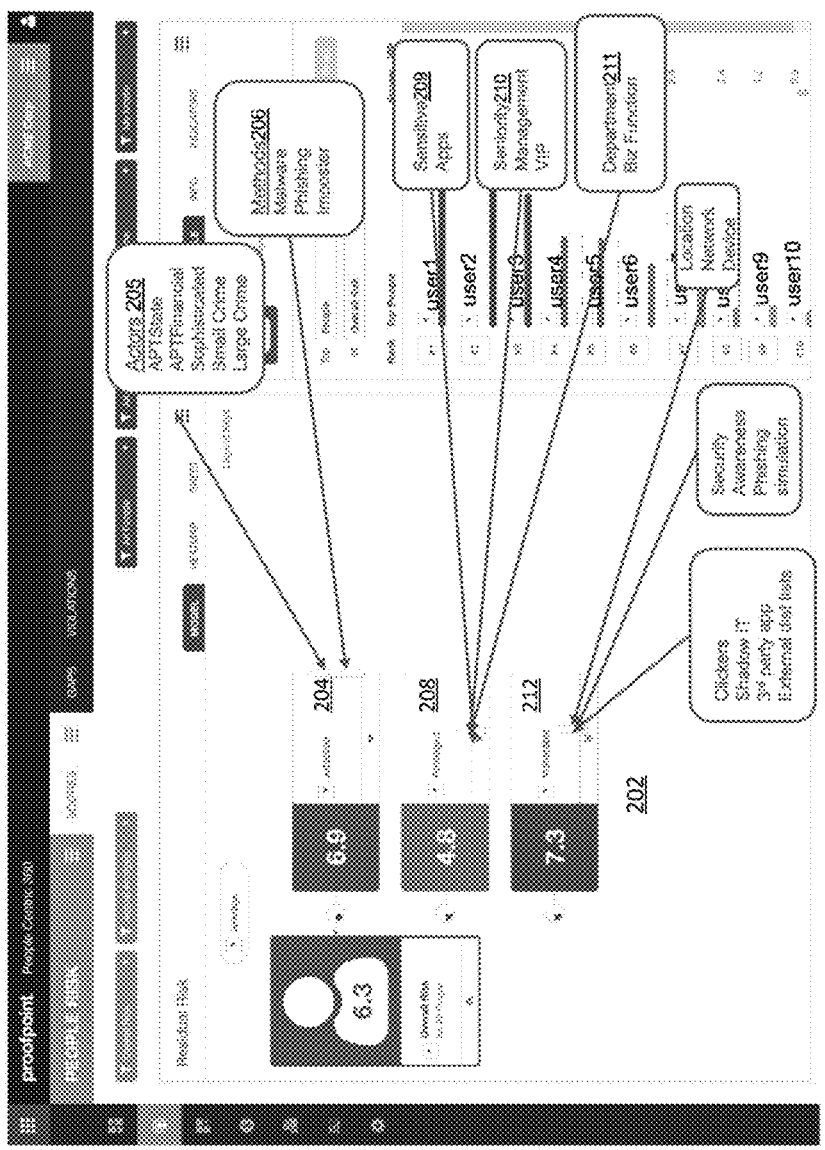
FIG. 2(a) is a diagram illustrating a screen display or user interface showing the cybersecurity risk score(s) for an organization and allowing an analyst to investigate the contributing factors to those scores, in accordance with embodiments of the systems and methods described herein.
Figure 2B:
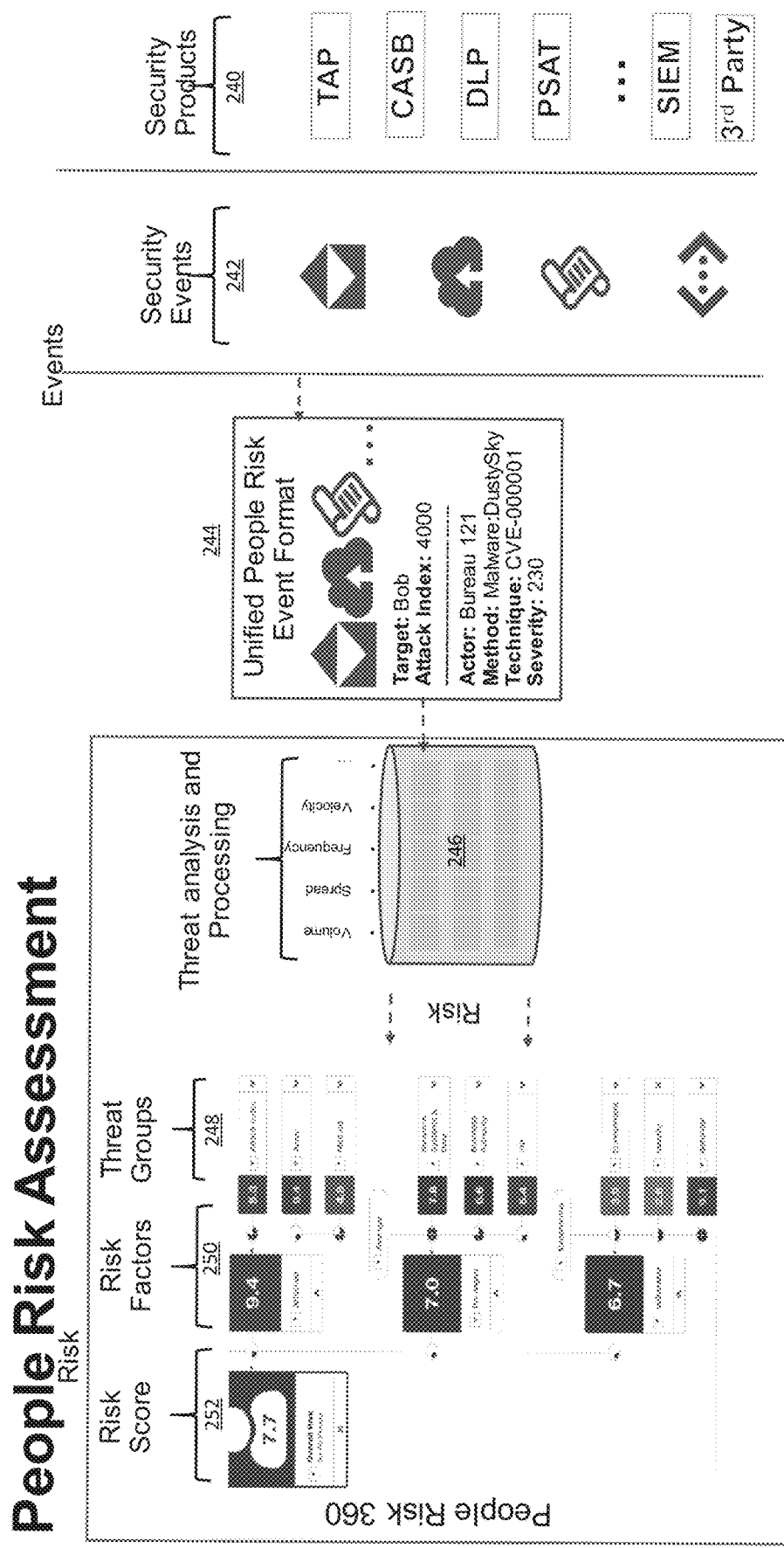
FIG. 2(b) is a diagram illustrating the process of collecting security events from a set of security products and translating them into a measure of the people centric security risk for an organization, in accordance with embodiments of the systems and methods described herein.
Figure 2C:
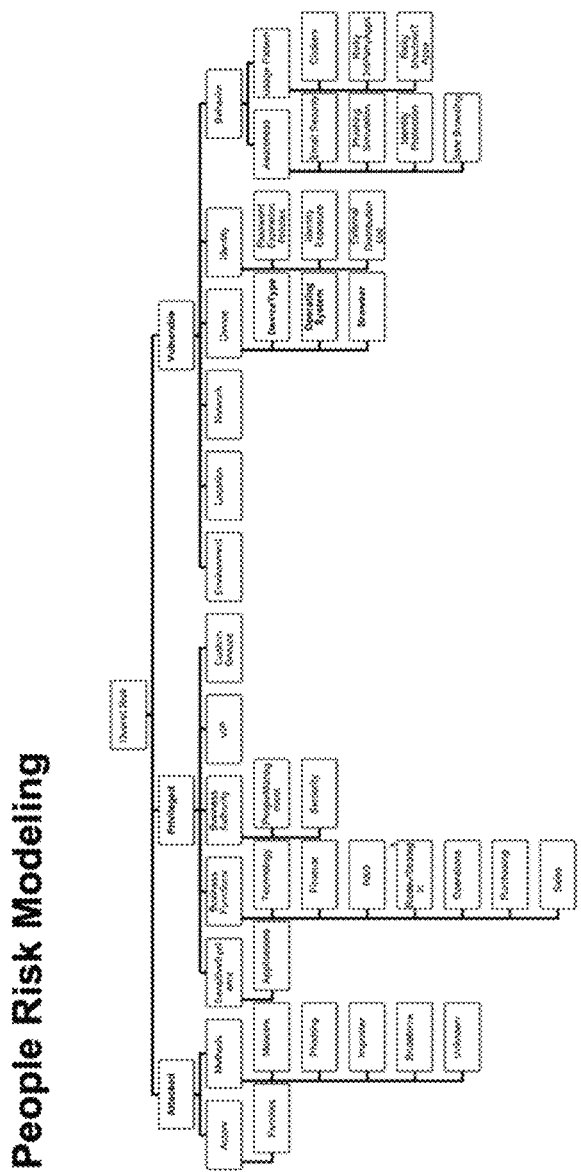
FIG. 2(c) is a diagram illustrating an example of a people risk modeling "tree" for an organization, in accordance with embodiments of the systems and methods described herein.
Figure 2D:
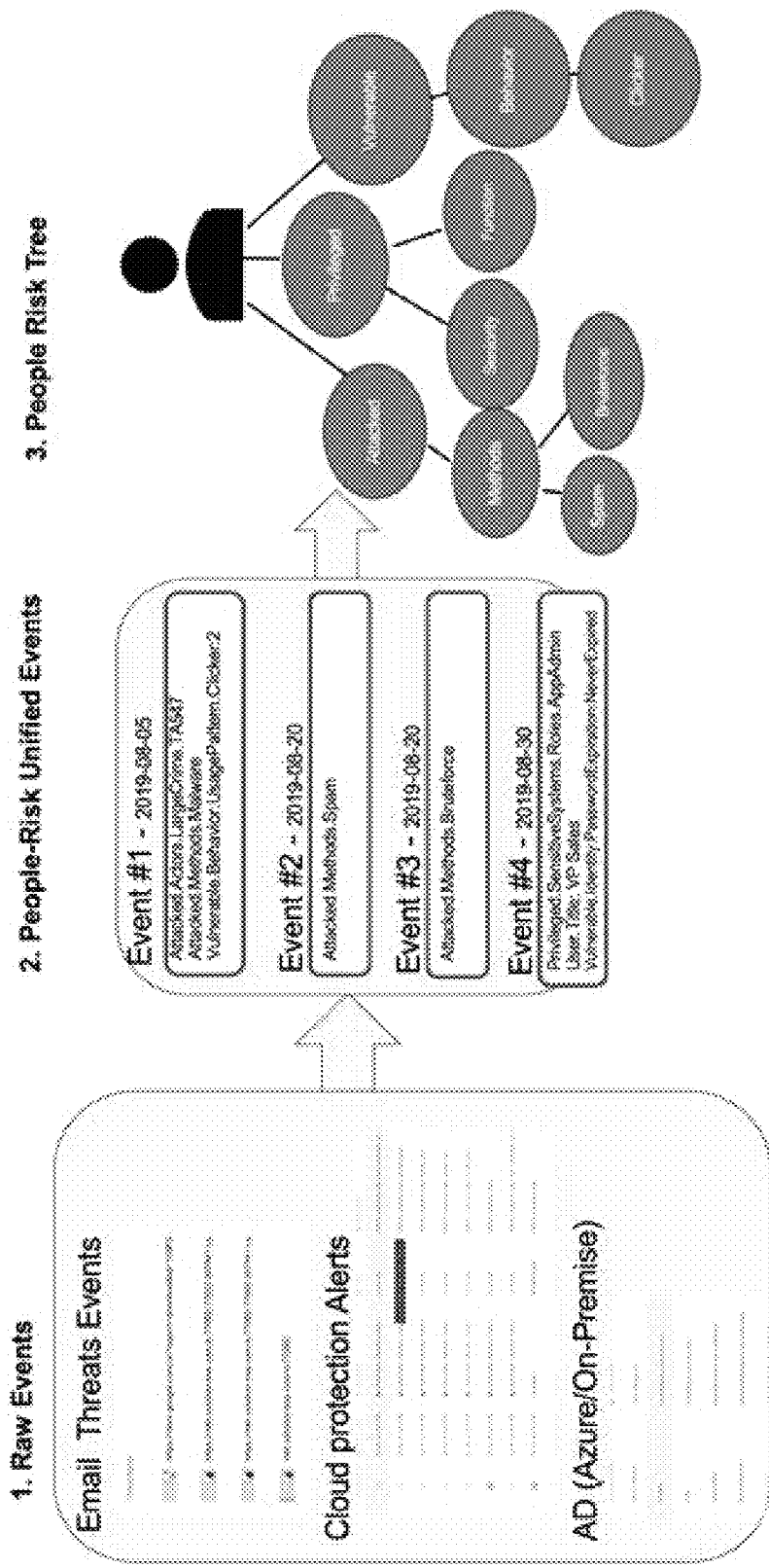
FIG. 2(d) is a diagram illustrating an example of how specific events may be transformed into a risk event and then represented as part of a risk tree, in accordance with embodiments of the systems and methods described herein.

Embodiments of the systems and methods described herein may include construction of a People Risk Modeling Tree (an example of which is shown in FIG. 2(c)). The risk modeling tree defines/illustrates a hierarchy of risk attributes or risk factors that are believed relevant to assessing the cybersecurity risk posed by a person or group of people. The example risk modeling tree shown in the figure represents a series of nodes or "leaves" arranged into categories, where the nodes represent risk factors or behaviors that are believed to contribute to specific categories or segments of cybersecurity risk. The risk modeling tree is one example of a structure or organizing format for the various forms or types of cybersecurity risk, although other forms, structures, data formats, etc. may also (or instead) be used in embodiments.

In some embodiments, the top-level risk scores in the tree (those for the AP, VP and PP groups) may be used to determine whether a person will be placed into a certain group or sub-group, or into a sub-group formed from an intersection of the primary groups or sub-groups (a process termed segmenting herein). An upper or higher-level risk score on the tree may be derived from (or generated by) combining the lower, more specific leaves or nodes of the tree, where each node or leaf represents a specific type of cybersecurity risk behavior or characteristic. This process may be referred to as "People Risk Modeling (PRM)."

Note that the risk modeling tree is dynamic and may be extended, modified, etc. in response to changes to the actual or potential threat landscape, such as new attack methods, techniques, vectors, etc. The tree may also be extended or modified as new attributes, risk contributions, or risk factors are identified so that those may be taken into account in assessing a person's or an organization's risk. The risk scores or metrics for lower-level attributes (the tree's leaves below a node) may be combined into a higher-level risk score by use of any suitable process or combining method, including but not limited to the example process provided in the Appendix to this application.

As more is learned about risk factors, attack methods, targets of attacks, people's behaviors, sources of threats, etc., a risk modeling tree may be altered to reflect those factors or methods and to place them into a data structure that identifies the factors or methods and organizes them according to how to they contribute to a person's or to an organization's risk. In this sense, a risk modeling tree is a form of Ontology of risk factors and their relationship or contribution to a risk group or category. Although a risk modeling tree has been described as a form of identifying risk factors or contributions to risk and organizing their relationships, note that embodiments may instead or in addition use a different form of data structure, such as a relational database, network of nodes and edges, graph, etc.

The risk modeling tree represents a way of illustrating the relationships between the sources of data regarding cybersecurity risks (for example, security events or security event monitoring services and systems and their respective signals or data) and the various factors or components that may contribute to a person's total cybersecurity risk. As shown in the example risk modeling tree of FIG. 2(c), the overall or total risk is composed of contributions from the three primary factors mentioned—risk associated with being a target of previous attacks (AP), risk associated with a person's access to data or information of potential value to an attacker (PP), and risk associated with a person's behavior (VP). As noted, this segmentation can be viewed as sorting a set of people based on their likelihood of being a target of an attack (e.g., their previous history of being attacked and/or their access to potentially valuable information) and the likelihood of an attack being successful (e.g., based on their behavior).

Each of the three primary categories or risk segments (i.e., AP, VP, and PP) is associated with possible contributions to the risk or information relevant to assessing the risk for that category, where the contributions and information are represented by the nodes or leaves of the risk modeling tree. These contributions or information may include specific modes used by an attacker, specific user behaviors that increase the likelihood of the success of an attack, or specific levels of authority or types of data accessible to a person. The lowest/bottom levels of the risk modeling tree represent data or signals that may be collected by security event systems or processes that can detect attacks and user behaviors, and can access current and/or historical data regarding previous attacks, user roles and seniority, etc.

Thus, in one example, security related events are detected by network or device monitoring software (as an example) and used as part of deriving a score or risk measure for one or more elements or "leaves" of a risk modeling tree. The security event data may be combined with information regarding a person's behavior (such as their response to previous attacks or their behaviors as identified from cybersecurity risk training) and/or information about a person's role and seniority in an organization to generate a more complete evaluation of the risk associated with the person. In one example, a score or other form of risk measure may be generated by a trained machine learning model and associated with a risk factor or leaf, as will be described in greater detail. The individual risk scores or measures generated by a plurality of trained models and/or obtained directly from signals provided by the security event monitoring tools may be combined from the lower levels or leaves of the tree upwards using one of the methods or approaches mentioned for combining scores (e.g., weighted average, highest risk, exponential weighting, etc.).

The data or information used to determine a risk profile, metric, score, classification, segmentation, category, or other indication of a degree of risk for a specific person may include, but is not limited to or required to include:

- data from security products relevant to attacks directed at that person;
  - for example, network, system, or device monitoring software that identifies information regarding sources of attacks, attack vectors, the timing of attacks, attack methods (e.g., email, text, etc.);
  - signals that can be used to determine a relative magnitude of the attacks on a specific person and the timing of attacks;
  - signals that can be used to determine a specific source or type of attack source/actor;
  - in general, data or signals indicative of one or more of an attack, a risk of being attacked or the risk of an attack being successful;
- information about behavioral vulnerabilities of the person obtained from the security products and the person's security awareness training (which may be indicative of a person's cyber security awareness or susceptibility to a specific type of attack or technique);
  - this can take into account the amount of training, time of the training, responses to training scenarios, or other relevant factors; and
- information about personal privileges and access;
  - for example, a person's access to sensitive data and applications;
  - business authorizations;
  - management roles;
  - access to systems and networks;
  - this information may in some cases be obtained from system or network user data repositories (e.g., directories) and privilege management systems, as well as from security products.

Note that each of these types of data provides information relevant to one of the three primary categories or groups of people at risk—attacked people, vulnerable people, and privileged people. For example, the likelihood or risk of being attacked may be related to a person's prior history of being attacked, their role in an organization and access to critical data or systems, or their behaviors (such as with regard to patching security flaws in software they use, accessing an organization's network over an insecure connection, clicking on links in emails, etc.). Similarly, the likelihood or risk of an attack being successful may be impacted by a person's behavior and their previous cybersecurity training.

The signals and/or data obtained from the security products may be in the form of a measure or format that is specific to a security product. This means that in some cases the data or signals may need to be converted or transformed into a common format (i.e., normalized) so that they can be compared, filtered, subjected to a threshold, and combined. In some embodiments, this conversion or transformation may be in the form of a mapping between a signal or data and a risk measure based on the experience of an analyst or cybersecurity advisor.

In some embodiments, a score, classification, or other metric indicating a relative measure or degree of cybersecurity risk for a person may be determined using a trained machine learning (ML) model. In one example, the inputs to a trained model are one of the types of information or signals described above that are obtained from a security product. In this use of a trained model, the model first "learns" how the signals or data from the security products relate to a risk measure or score for a risk factor. In this sense, the model is trained to translate or convert raw signal data into risk scores representing a score for a leaf of the risk modeling tree. After training, the model applies what it has learned to new data and generates a measure or score that can be combined with other measures or scores to assist in segmenting a person into a specific risk group or sub-group.

In some examples, a ML model may be customizable or adjustable to fit different industries. In one example, this may be done by customizing the training data and annotations/labels to reflect specific information and categories of risk that are applicable to how an industry operates or evaluates (or characterizes) relative risk. For example, in the financial industry, the types of financial products an employee deals with, the size of clients they provide services to, or other aspects of their job may make them a more desirable target to an attacker.

In general, a machine learning model is trained using a set of annotated or labeled training data. The training data may be a portion of actual data used to evaluate the risk to an organization for a group of employees of an organization. For example, one-half of the actual security product signals and data for the employees in an organization may be used as training data. The data for each person may include signals and information describing the person with regards to one or more features (such as role, seniority, behaviors, previous levels or types of cybersecurity attacks, etc.). Associated with the data for each person is a label or annotation indicating the "correct" risk segment, classification, metric, cybersecurity risk category, score, etc. for that person.

The labels serve to "teach" the model how to associate the input attributes (the input data associated with a person) with the desired output information (the label, that is a risk score, metric, classification, or segmentation). A machine learning model is trained on the labeled dataset in a form of supervised learning. The model may be a deep neural network (DNN) or similar form of representing a trainable set of relationships. After training, the model operates to receive as an input a new person's characterizing data (which may be tokenized into words, but this is not required) and in response generate an output representing the person's expected or predicted cybersecurity risk (e.g., expressed as a score, metric, classification, relative level, etc.) as a result of those characteristics. As mentioned, this score or metric may represent one risk aspect or factor, such as the contribution of a leaf in the risk modeling tree (or a similar representation of risk contributions) to the overall risk.

Once trained, a model can automatically predict or generate the probability or confidence level in each of one or more outputs representing the person's likely risk scores or risk levels based on the input data associated with the person. The output of a trained model (after normalization or conversion if needed) may be used to provide a score or risk level for a "leaf" in the risk modeling tree, or for a collection of "leaves". The plurality of risk scores or risk levels may then be combined in one or more of the ways described to generate a risk score or level for a higher-level leaf or node in the tree.

As an example, in the Attacked People (AP) high-level node of the Risk Modeling Tree shown in FIG. 2(c), a risk score for that "upper" node may be calculated based on one or more of the following inputs to a trained model or models (some of which may determine a risk measure for a lower "leaf" attribute in the AP section of the tree): (1) the magnitude of attacks performed on a person, (2) the identity or believed identity of the actor(s) attacking the person, and (3) the vector (email, web, etc.) and (4) method (malware, phishing, etc.) used to deliver an attack. Each sub-node or "leaf" in the tree in turn may be described by other, more granular attributes. As mentioned, in some cases, a trained machine learning model may be used to assign a score or risk level to one or more of these granular attributes. The machine learning model may be trained using a set of annotated data to generate an expected score, metric, or risk category for a new user (i.e., one whose data was not used as part of the training set).

The trained model assigns a score, metric, risk level, or other form of classification for a person based on input data that is relevant to a risk factor or risk contribution. The risk factor or risk contribution may be represented as a node or leaf of a risk modeling tree. A plurality of trained models may be used to develop a set of scores, metrics, classifications, segmentations, or categories for a person. The separate scores or metrics may require conversion or transformation into a form in which they can be compared and/or combined. One example method of combining multiple risk scores or metrics to produce a final or overall cybersecurity risk score or metric is described in the Appendix to this application, which forms a part of and is incorporated in its entirety into this application. The process described in the Appendix may be used to combine the individual risk scores or metrics for each of a plurality of sub-nodes or lower-level nodes in a risk modeling tree into a risk measure for a higher-level category or node.

As an example, some embodiments are directed to how specific risk attributes (which may be represented as a lower-level node or leaf in a risk modeling tree) may be calculated based on threat signals received from security products, security monitoring services, and other sources of information. For example, if a person has a history of clicking links embedded within emails he/she receives and has clicked on malicious links in the past, then this person may be identified with a relatively high risk score for the "Clickers" attribute which is part of a higher level "Behavior" attribute, which in turn belongs to a "Vulnerability" node in the risk modeling tree. This type of hierarchical categorization is termed "People Threat Processing (PTP)" herein. In one example, information collected from security products may be normalized into a Unified People Risk Event format (as illustrated in FIG. 2(b)) and then assigned a corresponding risk score.

In some embodiments, the UPRE may include the following fields or values:
Person ID
Timestamp
Type of raw security event (e.g. clockers)
Extended data (e.g. number and dates of clicks within last month)
Risk score (calculated/determined risk score)

A value of the UPRE is in its unification of security events into a risk event format. Regardless of the sources of the raw event data, the UPRE record can be used in an overall risk score calculation of the type described in the appendix.

In some embodiments, a normalization procedure may be used and may be specific to the type of information collected. For example, a process may convert specific types of data into static risk scores, may use ranges of counters, apply thresholds, perform a comparison to company and industry averages, or may use specific algorithms which add additional factors to a risk score calculation. Normalization may be used in order to be able to compare or combine various types of risk related data, such as data from different sources of risk related security events or the outputs of models. For example, in some cases security event data may represent the number of violations (of a data loss prevention policy (DLP), for example), while in other cases data may be a score (of a degree of a person's security awareness as indicated by security training, for example). Based on the source of security related data, it may require a form of normalization in order to be combined with other risk factor scores and used to generate a total risk score or overall metric.

As described, the signals and data from security products and monitoring processes may be used as inputs to one or more trained machine learning models. The output or outputs of the models may represent classifications, segmentations, metrics, or scores for a person with regards to one or more sources or types of cybersecurity risk. The set of classifications, segmentations, metrics, or scores may be normalized, combined, subject to thresholding, etc. to obtain a final risk score or metric. The final risk score or metric may be used to assign the person to a specific risk group (e.g., AP, PP, or VP) or groups. The risk scores or groups for a set of people in an organization may be combined to obtain a score or metric for the organization as a whole. Further, based on the risk group or groups to which a person is assigned or segmented into, a specific risk reduction process or protocol may be applied. The risk reduction process or protocol applied may be specifically directed at reducing or preventing risk arising from a characteristic of the members of a group (AP, VP, PP), sub-group (VAP, VVP, VPP) or target group (Imminent Targets, Major Targets, Latent Targets, and Soft Targets).

For example, "Email security" training for clickers might reduce the amount of clicking events, or a review of sensitive data access privileges might lead to retracting unnecessary privileges and by that a reduction of the potential damage. As another example, deploying additional cloud security controls might minimize the number of successful account takeover attempts and reduce the attacked risk.

FIG. 1(a) is a diagram illustrating certain primary aspects of an effective people-centric approach to cybersecurity, in accordance with embodiments of the systems and methods described herein. As shown in the figure, in some embodiments a people-centric approach to cybersecurity risk prevention and management involves consideration of three primary indicators or categories of future risk; those that have been attacked previously, those having certain roles and privileges in an organization and hence access to certain information or infrastructure, and those having certain behavioral vulnerabilities.

FIG. 1(a) illustrates examples of the value propositions of some embodiments of the systems and methods described herein. These value propositions include:

- Prioritization—since there are generally limited resources available to apply to a security solution, the systems and methods described can be used to assist security officers and analysts to prioritize how best to invest in security related applications, detection mechanisms, training, etc. In this sense, the systems and methods described can help place a focus on certain groups of people that may require additional security controls (investment) and vice versa;
- Correlation—it is difficult to correlate data between multiple channels of security events. The systems and methods described use a risk modeling tree or similar data structure to represent multiple possible sources of risk and the relationship of those sources to higher level categories of risk (such as the AP, VP, and PP categories). The risk modeling tree provides an association between data and signals from security products arising from security events and a set of risk factors. This provides an ability to further process the information and find specific sources of threats, risk trends, anomalies, etc. For example, if the system finds that a person is highly attacked (i.e., VAP) and they are identified as having a relatively high degree of privilege (i.e., VPP), then this information can be correlated and used as a basis to build a group susceptible to being a target so that a security team can focus their efforts on that group; and
- Mitigation—by enabling segmenting of people at risk and identifying the factors that make them part of a certain risk group/segment or target group, an analyst can select and prioritize the application of specific security measures or techniques. This enables a security team to avoid applying security controls across an entire organization (unless indicated as necessary), and also allows an analyst to address the highest priority risks before allocating resources to addressing lower priority risks.

Segmenting the people in an organization into the groups, sub-groups and intersections of sub-groups (and hence into target types or profiles) described herein may provide a cybersecurity team with one or more of the following benefits:

- an ability to associate people in an organization with their relative degree of cybersecurity risk, and in response to prioritize the application of threat prevention and remediation techniques and services;
- an ability to correlate different security threats and modes of attack to obtain a fuller picture of the cybersecurity threat to an organization; and
- an ability to take person or group-specific actions to reduce the likelihood of a successful cybersecurity attack and to take proactive steps to prevent further attacks.

FIG. 1(b) is a diagram illustrating an example of how a group of people in an organization may be segmented into groups, sub-groups, and target type(s) based on an intersection of the sub-groups, in accordance with embodiments of the systems and methods described herein. The Figure illustrates an example of how the members of an organization may be segmented into risk groups more or less likely to create a risk based on (a) general attributes of being privileged, vulnerable to an attack, or having been attacked, (b) belonging to a sub-group considered to be at a higher level of risk than a member of the group having the general attribute and (c) belonging to an intersection of one or more of the sub-groups.

FIG. 1(b) also illustrates specific examples of employee segmentation that may result from application of the concepts illustrated in FIG. 1(a). In this regard, the figure provides examples of employees who may end up in one of the various categories or groups, sub-groups and target types based on their previous history of attacks, personal behavior, and role in an organization. As shown in the figure, a receptionist may be placed into a target category of being a "soft target" by virtue of belonging to an attacked group (and more specially, a very attacked person group) and a vulnerable person group (more specifically, a very vulnerable person group, arising from his/her behavior in response to training or previous attacks).

FIG. 1(c) is a diagram illustrating an example of how the members of an organization may be segmented into groups more or less likely to be the target of a cybersecurity attack and hence to present a risk based on (a) general attributes of being privileged, vulnerable, or attacked, (b) belonging to a sub-group considered to be a higher risk member of the group having the general attribute and (c) belonging to an intersection of one or more of the sub-groups. As shown in the figure, a group of people may be segmented into one of the three primary groups (AP, VP, PP) based on meeting a "basic" threshold value for membership in that group.

In some embodiments, the threshold value(s) may depend upon risk measures reflective of previous behavior or levels of behavior, previous history of being the target of an attempted attack, or being in a position where they have access to information or systems that may be of interest to a malicious party. Further, a subset of each group may present a relatively higher risk by having a history of attacks or behavior, or being in a position that indicates a characteristic exceeding a "priority" threshold for a particular group (e.g., this defines the members of the VAP, VVP, and VPP sub-groups), where the threshold may depend on a specific percentage of members of the group, be learned from data used as part of training a ML model, be set by a security analyst, etc.

As mentioned, in some embodiments, each of these three primary groups are defined as follows:

- Attacked People (AP)—a dynamic group of people that experienced a single (or multiple) attack(s) or who have passed a certain level of a customizable or dynamic threshold value;
- Vulnerable People (VP)—a dynamic group of people that have been determined to have a specific type of vulnerability, such as a vulnerable behavior, using vulnerable systems, etc. or who have passed a certain level of a customizable or dynamic threshold value; and
- Privileged People (PP)—a dynamic group of people with access to sensitive systems, devices, networks, and data, or who have certain access authorizations or authority rights etc., or who have passed a certain level of a customizable or dynamic threshold value.

In some embodiments, after segmenting a group of people into one of the three primary groups (AP, VP, PP) based on their history of attacks, behavior, and access to systems and data, a threshold value may be applied to further segment each group into people having the highest risk within that group. The threshold value(s) may be determined by a learning process based on a sample of data (e.g., during the training of a ML model), by a value that is characteristic of an industry or characteristic of an organization, or a value may be set by an administrator and adjusted at a later time.

In one example, the sub-groups having an increased level or degree of risk are defined as:

Very Attacked People (VAP)—a dynamic subset group of Attacked People (AP). To belong to this group, people need to exceed a higher level of a customizable or dynamic threshold value (e.g., high risk score, top X % of population, etc.);

Very Vulnerable People (VVP)—a dynamic subset group of Vulnerable People (VP). To belong to this group, people need to exceed a higher level of a customizable or dynamic threshold value (e.g., high risk score, top X % of population, etc.); and Very Privileged People (VPP)—a dynamic subset group of Privileged People (PP). To belong to this group, people need to exceed a higher level of a customizable or dynamic threshold value (e.g., high risk score, top X % of population, etc.).

Next, in one embodiment, the intersection regions of each of the three sub-groups are used to identify likely "target" groups, types or profiles. These target types or profiles may include the following:

Imminent Targets (IT)—a dynamic group of people that have passed certain customizable or dynamic threshold values in VAP, VVP and VPP;

Major Targets (MT)—a dynamic group of people that have passed certain customizable or dynamic threshold values in VAP and VPP;

Latent Targets (LT)—a dynamic group of people that have passed certain customizable or dynamic threshold values in VVP and VPP; and Soft Targets (ST)—a dynamic group of people that have passed certain customizable or dynamic threshold values in VAP and VVP.

The naming of these intersection sub-groups is provided as guidance and can be altered based on an organization's own experience. In the example shown, Imminent Targets represent the group of people thought to be at the highest combined risk and thus to require more immediate attention. Major Targets refers to people that are usually targeted as they have a high level of privileges within an organization, and as a result, they are typically identified and targeted. Note this sub-group is the set of people that typically get attention from conventional risk management approaches. Latent Targets are considered highly likely to be a source of a security breach at some time. They are highly vulnerable (e.g., they express vulnerable behavior by opening malicious links or having data loss prevention problems) and they are privileged and have not been previous targets or at least not to a relatively high degree. For example, this target group could include an accounting person responsible for SWIFT transactions. At present, they are not well-known, but if he/she decides to publish information about their job on a social network site, it is likely they will become attacked or more frequently attacked. Soft Targets are usually people that are targeted by widespread attacks, although sometimes they are specifically selected since they are vulnerable and are the first "weak link" an attacker can take advantage of. Typically, hackers start with these soft targets and use what they learn to attempt to laterally move within an organization to get to the real target they want to attack or the real information they are seeking.

FIG. 2(a) is a diagram illustrating a screen display or user interface 200 showing the cybersecurity risk score(s) for an organization and allowing an analyst to investigate the contributing factors to those scores, in accordance with embodiments of the systems and methods described herein. As shown in the figure, a display or user interface may include a Risk Tree representation 202 (typically of the highest-level nodes, but in some cases expandable to show lower level nodes), where each element in the tree describes a cybersecurity risk associated with people in an organization. The primary nodes may be associated with a risk measure or score (e.g., the values 6.9 for Attacked, 4.8 for Privileged, and 7.3 for Vulnerable). For example, the Attacked Persons UI element 204, may be selectable and expandable to include an indication of the Actors or sources of an attack on an individual organization 205 and/or the methods used for attacks 206. Similarly, the Privileged Persons UI element 208 may be expandable to include an indication of information regarding the members of the Privileged Group, such as the Sensitive applications they have access to 209, the level or levels of seniority of people in that group 210, and the departments or business functions of the members of the group 211. As shown, the display may also include a selectable UI element for the Vulnerable Persons Group 212 that when selected may expand into showing other risk elements that contribute to membership in that group (such as behaviors and/or their security training).

FIG. 2(b) is a diagram illustrating the process of collecting security events from security products and translating that data into a people centric security risk measure for an organization, in accordance with embodiments of the systems and methods described herein. The Figure also shows part of a graphical display or user interface that may be used by a cybersecurity or IT administrator to, among other functions, examine an overall risk score for a user, as well as its component factors or attributes, and examine the process by which that user was exposed to a threat. The display shown in FIG. 2(a) or FIG. 2(b) may also provide an administrator with tools to adjust the allocation of security resources (such as specific applications or screening programs, specific security requirements, etc.) to a user.

As shown in FIG. 2(b), a set of security products 240 may be used by an organization to monitor cybersecurity threats to its systems, employees, devices, networks, and data. The labels or names for the security products in the figure correspond to those of the assignee of the disclosure but of course are simply representative of those being used. Security products 240 are used to detect Security Events 242. Security Events 242 are attacks or attempted attacks on a person or organization and may be attempted by one of several different mechanisms or channels (as suggested by the icons for email, cloud, etc. in the figure). The events are detected by Security Products 240 and in response, Security Products 240 generate signals and/or data. The signals and/or data are representative of the attack and/or information characterizing some aspect of the attack. This may include but is not limited to an alert, time stamp, counter value, indication of an attack mechanism, attack payload, etc.

FIG. 2(b) also illustrates how the signals and data obtained from security products in response to security events are normalized into a unified event format 244 (UPRE—Unified People Risk Event). This may involve conversion or transformation of the output of a security product into a format suitable for further processing. Each UPRE is then represented by or converted into multiple threat signals. For example, a single event which describes an attack by a known actor, performed over a certain vector, and using a specific method may be translated into three threat signals representing the 1. Actor, 2. Vector, and 3.

Method. Each threat signal may be normalized into a risk score in the Threat Analysis and Processing procedure 246.

In one example of the Threat Analysis and Processing that may be performed, the security event(s) are mapped to specific risk factors or elements, such as those described herein. Each security event may be mapped to one or more risk factors or contributions to risk. Examples of these risk factors or contributions are the leaves in the risk modeling tree of FIG. 2(*c*). Information or data may be extracted from each security event (such as that suggested above regarding actor, vector, and method of attack) and used as an input to a model to determine a measure of the risk associated with a specific risk factor or risk tree leaf. As shown in FIG. 2(*b*), the output of a Threat analysis and processing function 246 may be data that is provided to a set of threat groups 248 representing categories or aspects of risk associated with a specific risk factor 250 (and which may viewable by selecting a UI element associated with a risk factor). The risk factors (AP, PP, VP) are combined into a total risk score 252 for an individual or organization.

The left side of FIG. 2(*b*) shows a portion of a risk modeling tree (as indicated by the "Threat Groups" 248, "Risk Factors" 250, and "Risk Score" 252 sections of the figure). Referring to FIG. 2(*a*), that Figure shows the upper 3 nodes or categories of the risk tree (Attacked, Privileged, Vulnerable). When an analyst selects one of the risk factor elements or categories in FIG. 2(*b*) or in a similar display or UI, the display may expand to show further lower level sub-elements or leaves that contribute to the risk score for the upper or higher-level element (as shown in FIG. 2(*b*) in the form of "Threat Groups" 248). By selecting other elements, an analyst can investigate the risks associated with each element or category. This provides an analyst with a tool to look at the entire set of risk factors and their relative contributions to risk for a person or group of people.

As shown in FIG. 2(*c*), a Risk Tree is divided into risk groups (Attacked, Privileged and Vulnerable), which in turn are divided into sub-groups indicating aspects or contributions to that risk group. As described, a risk modeling tree is an example of an Ontology or data structure for representing and organizing contributions to the overall risk. In some embodiments, the bottom leaves in the tree model may include normalized risk scores for each people-associated threat. When a security analyst selects a node or leaf in the risk tree, he/she may receive information about the node which may include current risk level, a comparison to industry/global averages, people in the organization at risk in that node, top identified vulnerabilities, top recognized threat sources (actors), etc. As also mentioned, a risk modeling tree is an example of a possible data structure that may be used in embodiments to represent and organize risk contributions. It may be modified or otherwise altered to include or remove risk factors and changed to illustrate their relationships as more is learned about cybersecurity threats, methods, contributions, etc.

FIG. 2(*d*) is a diagram illustrating an example of how specific events may be transformed into a risk event and then represented as a risk tree. As shown in the Figure, event signals from security products (referred to as "1. Raw Events" in the figure) provide data and information used to determine specific event related parameters. These parameters are mapped or converted to a common format or representation (referred to as "2. People-Risk Unified Events" in the figure and as "UPRE—Unified People Risk Event" at other places herein) and then subjected to further processing (if needed). The result(s) of the processing provide either a measure of risk associated with a specific factor or leaf, or an input to a model used to determine that measure of risk (as suggested by "3. People Risk Tree" in the figure).

A variety of algorithms or data processing methods may be used for normalization purposes. Such algorithms or methods may take into consideration one or more of the volume, spread, frequency, velocity and other characteristics of each threat signal. Once a risk score or metric corresponding to each threat signal or source of threat data is calculated by a suitable ML model or data processing technique, a risk tree may be populated with risk scores for the threats and then can be used to identify the people centric threat groups, sub-groups and target groups, providing a segmented picture of the cybersecurity risks associated with a set of people.

In a general sense and in some embodiments, the segmentation and cybersecurity risk remediation systems and processes described herein may perform one or more of the following methods, functions, processes, operations, or tasks:

(a) for each of a set of people:
  (1) obtain data related to cybersecurity attacks, attempted attacks and other events or activities relevant to cybersecurity for that person from security products and threat monitoring services;
    this may include signals and data related to security events or security-related events (i.e., including signals and data from security products and also from events or activities that may impact security, such as on-line presence, use of specific vendors or applications, etc.);
  (2) obtain data regarding the person's title, role and responsibilities from a directory of employees and information about access privileges to sensitive systems and data from a privilege management system; and
  (3) obtain data regarding the person's cybersecurity training experiences and responses to real or simulated threat scenarios and information about user behavior, e.g., browsing behavior, computer usage, etc.;
(b) depending on the form of the unprocessed data or signals, convert, transform, or otherwise process the data and/or signals to generate a normalized, common or canonical format representing each of the contributions to the overall cybersecurity risk for the person:
  this may include processing the signals and/or data to identify one or more aspects or characteristics of a cybersecurity attack or attempted attack, of a vendor or product, of another risk factor or contribution to risk, etc.;
    in some embodiments, the cybersecurity risk factors or contributions to cybersecurity risk may be those represented in a risk modeling tree or other data structure—such a tree or structure represents the contributions to risk and their relationships to determining categories of risk (such as Attacked People, Vulnerable People, and Privileged People) and total risk;
  the processing may include application of experience to convert a signal or data into a risk score or measure (in absolute or relative terms);
  the processing may include use of one or more trained machine learning models to transform raw data or signals into a risk score or measure for a specific contribution to risk;
(c) where applicable, input relevant data into one or more trained machine learning models (such as the model(s)

described herein) to output one or more risk scores, measures, metrics, or levels corresponding to the input data associated with the person;

(d) combine the normalized scores or metrics for each risk contribution as indicated by the structure and organization of a risk modeling tree or other data structure to obtain a risk score or metric for the person for each of the primary risk categories (AP, VP, PP);

combine the primary risk category scores to obtain a total or overall risk score for the person, where the combination may be performed based on a selected process, weighting, etc.;

(e) define and apply the applicable threshold or filtering values for membership in the sub-groups of Very Attacked People, Very Vulnerable People, and Very Privileged People, and based on those, if applicable, assign the person to the appropriate sub-group or sub-groups (i.e., VAP, VVP, VPP);

(f) based on assignment or segmentation into one or more of the sub-groups (VAP, VVP, VPP), determine if the person is a member of any of the target groups found from intersections of the sub-groups;

as described herein, in some embodiments, these intersections are defined as: Imminent Targets (IT=VAP+ VVP+VPP), Major Targets (MT=VAP+VPP), Latent Targets (LT=VPP+VVP) and Soft Targets (ST=VVP+VAP);

(g) allow a security analyst to select and apply an appropriate security process or protocol to the members of each group, sub-group, or target group;

(h) in addition to scoring and segmentation or assignment of each of the set of people in an organization (which may include all members or employees, those in a specific division, those working on a specific contract or project, etc.), determine one or more of:

the number of people in each group, sub-group, and target group;

the identity of each person in each group, sub-group, and target group;

the total risk scores or measures of all of the people in each group, sub-group, and target group; and combine the total risk category scores for all of the people in each of the primary groups (AP, VP, PP) to obtain a total or overall risk score for the organization, where the combination may be performed based on a selected process, weighting, etc.;

note that this combining may also be performed for the sub-groups or target groups to obtain a more granular "picture" of the risk aspects or contributions to risk of an organization for purposes of comparison after the application of risk reduction procedures, for comparison with other organizations, etc.;

(i) generate a display or user interface and enable a security analyst to investigate and evaluate the risk scores and contributions to risk for the organizational as a whole from a person, a subset of people, a risk group, sub-group, or target group within the organization;

this may include providing selectable UI elements to enable an analyst to vary thresholds for sub-group membership, explore characteristics of a group (such as role, title, or other characteristic), sub-group, or target group, view contributions to the total risk score for a group, sub-group, or target group;

(j) allow the security analyst to apply an appropriate security process or protocol to the organization as whole; and (k) if desired, allow the security analyst to compare the organization to others in the same industry, location, revenue range, profit range, etc. with regards to overall risk scores, percentage of employees in a specific group, sub-group, or target group, etc.

As described, an embodiment of the system and methods described herein enables segmenting a group of people into cybersecurity risk categories according to factors that may include their role in an organization, their access to confidential or proprietary information, their having previously been a target of an attack, and their personal behavior. As mentioned, the segmentation process is dynamic as is membership in the groups or sub-groups; this means that a person may move between the groups or sub-groups in response to changes in their role, behavior or other factors.

As a result of the segmentation, embodiments enable a cybersecurity analyst to perform a set of functions, including but not limited to:

Set or modify a security policy/protocol applicable to a specific group, sub-group, or target group;

Set or modify a cybersecurity training program applicable to a specific group, sub-group, or target group;

Compare one organization's security risk profile to that of another organization;

Compare the security risk profile of the same organization over time;

Implement a risk prevention program for a specific group, sub-group, or target group;

Implement a specific remediation policy in response to a successful attack on a group, sub-group, or target group;

Monitor and evaluate the cybersecurity risk to an organization over time, including monitoring of at-risk people or groups, attack methods (the threat vector), sources of attacks and successful attacks;

Compare one organization's security/attack-prevention expenditures and approaches to that of another organization;

Allocate or reallocate cybersecurity resources and infrastructure to at-risk groups, sub-groups, or target types in response to a dynamic change in membership of a group, sub-group, or target group; and Analysis of the reasons or factors responsible for a person being moved from one group, sub-group, or target group to another; for example, a change in the magnitude of the attacks, a change in a person's privileges, or the introduction of new behavior vulnerabilities.

In some embodiments, the machine learning model(s) may be trained using historical data collected from multiple users and organizations, either with or without the addition of anonymized information from the organization whose employees or users are being analyzed.

Note that although machine learning has been described as being used to assign a risk score or risk metric to a person based on security product signals and data, or on a person's relevant input data, it may also be used for other purposes that are part of embodiments of the systems and methods described. For example, machine learning may assist in one or more predictive situations. These may include (a) prediction of groups forming, (b) prediction of risk, (c) prediction of people about to be included in a group, (d) examining clustering of groups, (e) identifying anomalies of risk attributes (compared to an industry, other risk attributes), and (f) identifying people of abnormal risk (compared to their peers, company, groups).

As described, in some embodiments, a machine learning model or models may be trained and used to automatically segment or classify a person, and/or generate a risk score or metric for a characteristic of a person based on the person's risk related data (including their previous attack experience, behaviors, role, security training level, or other leaf or node in the risk modeling tree illustrated in FIG. 2(c)). As will be described with reference to FIGS. 3(a)-3(d), this is accomplished by generating a set of training data for the model that includes multiple examples of relevant data.

The data used for training a model includes information that may be indicative of, or able to be used to determine a person's risk related scores or levels. The training data examples are each associated with a label or other indicator of the "correct" risk score, measure, classification, segmentation, or relative risk level of the person represented by the training data. The examples and labels are input to the model for purposes of training the model.

When trained, a model will operate to respond to input data for a person whose data was not used as part of the training by providing an output that indicates a risk score or measure for the person with respect to the risk contribution the model was trained to evaluate. As mentioned herein, in some examples, this risk contribution may be represented by a leaf or (sub)node in a risk modeling tree. In some embodiments, a model may output a probability of the person having a certain degree or level of cybersecurity risk. The output of the model may be expressed as a score or scores, a metric or metrics, a classification or classifications, a relative risk level, etc.

Figure 3A:
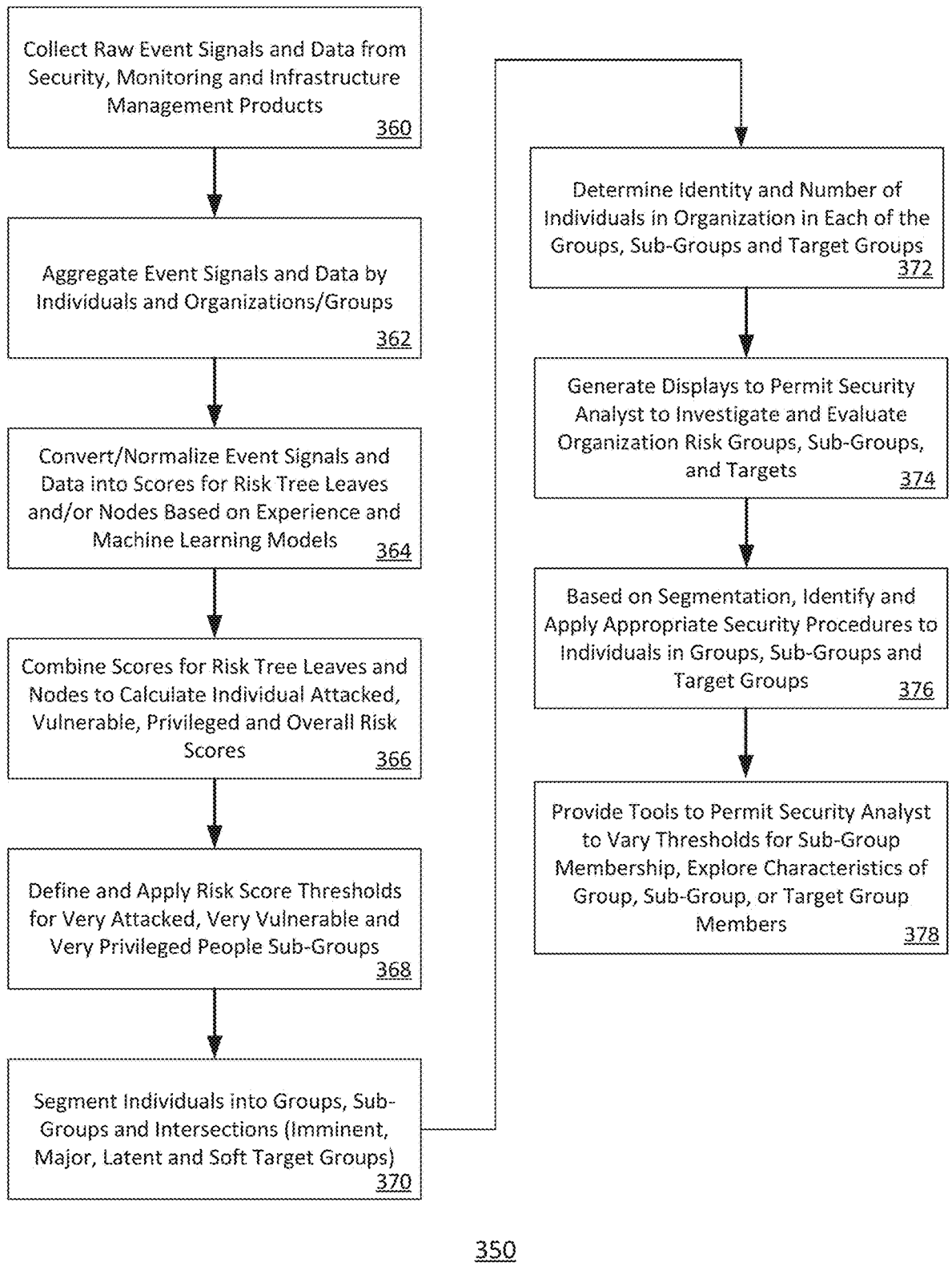
FIG. 3(a) is flowchart or flow diagram illustrating a method, process, operation or function for obtaining data from security events or products, processing that data to convert it into cybersecurity risk measures, mapping the risk measures to a risk modeling "tree", and using that mapping to segment a set of people into risk groups, sub-groups, and target groups, in accordance with embodiments of the systems and methods described herein. The segmenting may then be used to identify and apply an appropriate security policy or protocol to one or more of each person, group, sub-group, or target group or category, in accordance with embodiments of the systems and methods described herein.

FIG. 3(a) is flowchart or flow diagram illustrating a method, process, operation or function 350 for obtaining data from security events or products, processing that data to convert it into cybersecurity risk measures, mapping the risk measures to a risk modeling "tree", and using that mapping to segment a set of people into risk groups, sub-groups, and target groups, in accordance with embodiments of the systems and methods described herein. The segmenting may then be used to identify and apply an appropriate security policy or protocol to one or more of each person, group, sub-group, or target group or category, in accordance with embodiments of the systems and methods described herein.

As shown in the figure, in some embodiments, at step or stage 360, raw data is collected from one or more security products. The data may be acquired directly from the security products, obtained from a data storage element in which the security products store data for a specific organization or group (such as for an account maintained on a multi-tenant platform in the case of cybersecurity protection being provided as part of a SaaS platform), or other suitable source. The raw data may comprise signals, information, event counts, or other forms of data or information indicating the occurrence of a security event and/or information characterizing an event. The security products may comprise security monitoring, device monitoring, account monitoring, network monitoring or other infrastructure monitoring and protection products or services. The signals, information, data, etc. may result from a security event, such as a cybersecurity attack or attempted attack. The signals, information, data, etc. may also result from a different type of cybersecurity related event or activity.

At step or stage 362, the signals and/or data are aggregated or collected for each individual, predefined group of individuals, and/or organization. This may comprise storing all signals and data related to an individual (based on their devices and active logins) in a separate data storage element or section of the same. This may also comprise storing all signals and data from security products that are generated for an organization in a separate data storage element, directory, etc. At step or stage 364, the aggregated event signals and data are subjected to processing that converts, maps, or transforms the raw data into risk measures, risk scores, or other indicator of risk.

The conversion, mapping, or transformation of the security product signals and data into risk scores or measures serves to normalize the signals and data into a form in which the contributions from the different sources of cybersecurity risk can be compared and/or combined. This normalization may be the result of an experienced analyst deciding how to map a specific signal or element of data to a risk score or measure. In some cases, the normalization may result from the operation of a trained machine learning model that receives as an input the signals and/or data from a security product and operates to generate an output that represents a risk score or measure for a specific contribution to the cybersecurity risk. For example, a trained model may generate a score or measure representing the contribution of a leaf in a risk modeling tree to the cybersecurity risk of a person or organization. From one perspective, a trained model is used to "discover" relationships between security product signals and data and risk factors that contribute to the overall cybersecurity risk of a person or organization.

At step or stage 366 the scores or measures for each of a plurality of risk modeling tree leaves or sub-nodes are combined to generate a risk score or measure for each of the three primary risk groups, Attacked People, Vulnerable People, and Privileged People. The contributions or leaves that are combined into each of the three primary groups are determined by the arrangement of the leaves in the risk modeling tree or other data structure that represents the risk contributions and their relationships to risk groups, etc. In addition to the risk scores for an individual for each of the three primary groups, a total risk score for the individual may be generated. The total score may be produced by combining the three primary group risk scores in any suitable manner, including a weighted sum, application of a filter or threshold, etc. An example of a suitable combining method or process is provided in the Appendix to this application.

At step or stage 368, the risk score thresholds or limits for the sub-groups of Very Attacked People, Very Vulnerable People, and Very Privileged People are defined and applied. In some examples, these thresholds may be predetermined (such as the top 10% of members of a group, or those having a risk score in the top x %). In some examples, these threshold values may be based on information learned when training a machine learning model. The threshold values are applied, thereby determining if an individual is a member of a sub-group of VAP, VVP, or VPP.

Once the primary group (AP, VP, and PP) risk scores or measures for an individual have been generated from the risk tree leaves and their contributing scores, and based on those and a threshold value, the individual has been assigned or not assigned to each of the VAP, VVP, and VPP sub-groups, it can be determined if the individual belongs in one of the target groups formed form the intersections of the sub-groups. This is illustrated by step or stage 370, where an individual is segmented into the appropriate group(s), sub-groups (if applicable to a specific individual) and intersections of sub-groups (if applicable to a specific individual).

The segmentation of individuals may also be used to generate useful information regarding an organization or set of people. As shown at step or stage 372, the identity and number of people in an organization belonging to each group, sub-group, and target group may be determined and used by an analyst to evaluate and investigate the cybersecurity risk profile of an organization. This compilation of data may be used to generate one or more displays or user interfaces (as suggested by step or stage 374) to enable a security analyst to evaluate, investigate or otherwise interact with the data. This may include generating a display or user interface of the type shown in FIGS. 1(c), 2(a), or 2(b), for example.

A security analyst may then apply a suitable security procedure, constraint, restriction or protocol to one or more of the members of each group, sub-group, and target group, as shown at step or stage 376. The security procedure, constraint, restriction or protocol applied may be directed at addressing the characteristics of a person or group that may them susceptible to an attack or to a successful attack. For example, if a person is segmented into the target group of Latent Targets, then they may be subjected to increased security awareness education and training to correct behaviors that may make an attack successful (such as by making them more aware of the risks of selecting links included in messages, of logging into a network from a public location, etc.). This pro-active approach to preventing cybersecurity attacks or reducing the potential harm of an attack is just one of the benefits available through use of the embodiments described herein.

The displays or user interfaces may include selectable elements to enable an analyst to expand portions of a risk tree, vary thresholds for membership in sub-groups, explore numbers of members and the identity of members in groups, sub-groups, or target groups, compare the segmentation of individuals in one organization to another, compare the segmentation of individuals in an organization at two different times, etc. (as suggested by step or stage 378).

Figure 3B:
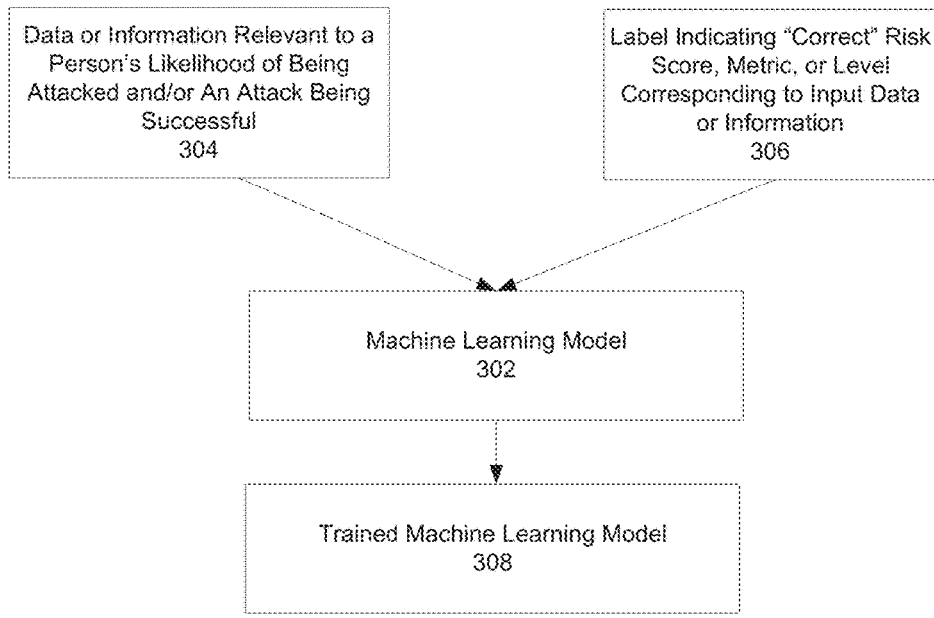
FIG. 3(b) is a diagram illustrating how a machine learning (ML) model may be trained to assist in determining a cybersecurity risk score, metric, or level for a specific risk contribution for a person, in accordance with embodiments of the systems and methods described herein.

FIG. 3(b) is a diagram illustrating how a machine learning (ML) model may be trained to assist in determining a cybersecurity risk score, metric, or level for a specific risk contribution for a person, in accordance with embodiments of the systems and methods described herein. As shown in the figure, in one example, a machine learning model 302 may be trained using a set of training data. The training data may include information relevant to each of a set of people's likelihood of being attacked and/or the likelihood of an attack being successful (for example, data regarding a person's previous history of being attacked, a person's role and title in an organization, or a person's behavior when confronted with a cybersecurity attack scenario). In addition, the inputs to a machine learning model include a corresponding label, indicator, or annotation 306 for each set of input data specifying the "correct" risk score, metric, or level corresponding to the respective persons' input data or information.

The data and labels for a set of people are input to the model to "teach" the model how to respond to the input data, producing a trained machine learning model 308. When trained, the model will operate to respond to a new sample of input information (such as data or information relevant to a person whose data was not used as part of the training process) by providing an output that indicates an appropriate risk score, metric, or level for that person with regards to a specific risk factor (such as might be represented by a leaf of a risk modeling tree).

Figure 3C:
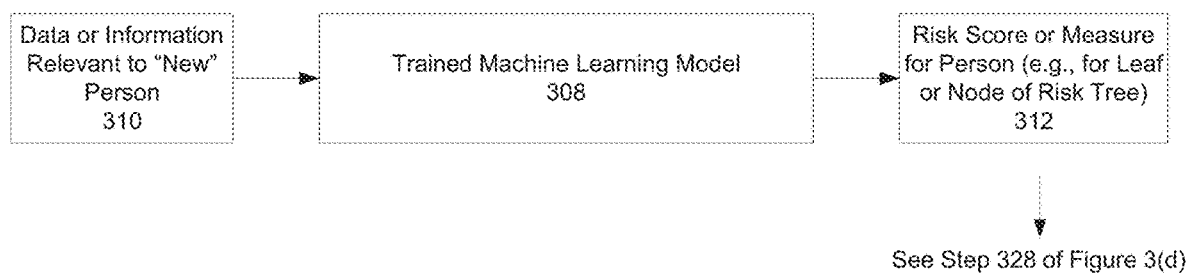
FIG. 3(c) is a diagram illustrating how the trained ML model of FIG. 3(b) may be used to assist in classifying or segmenting a person into a cybersecurity risk group, subgroup or target category by generating a risk score or metric for a specific contribution to risk, in accordance with embodiments of the systems and methods described herein.

FIG. 3(c) is a diagram illustrating how the trained ML model of FIG. 3(b) may be used to assist in classifying or segmenting a person into a cybersecurity risk group, sub-group or target category by generating a risk score or metric for a specific contribution to risk, in accordance with embodiments of the systems and methods described herein. As shown, a set of data or information for a new person 310 (one whose data was not used as part of the training data) is input to the trained machine learning model 308. In response, the model provides an output 312 which represents a classification of the input sample data (and hence for a specific risk contribution of the person) in the form of a risk score, metric, or level. Based on the type of input data and the labeling used during the training process, the trained model may generate a score (or metric, level, classification, segmentation, etc.) for a specific risk factor of the person or for a characteristic that is used to assess the total risk associated with the person. The use of a trained model or models is described in greater detail with reference to FIG. 2(c) and the risk modeling tree.

Figure 3D:
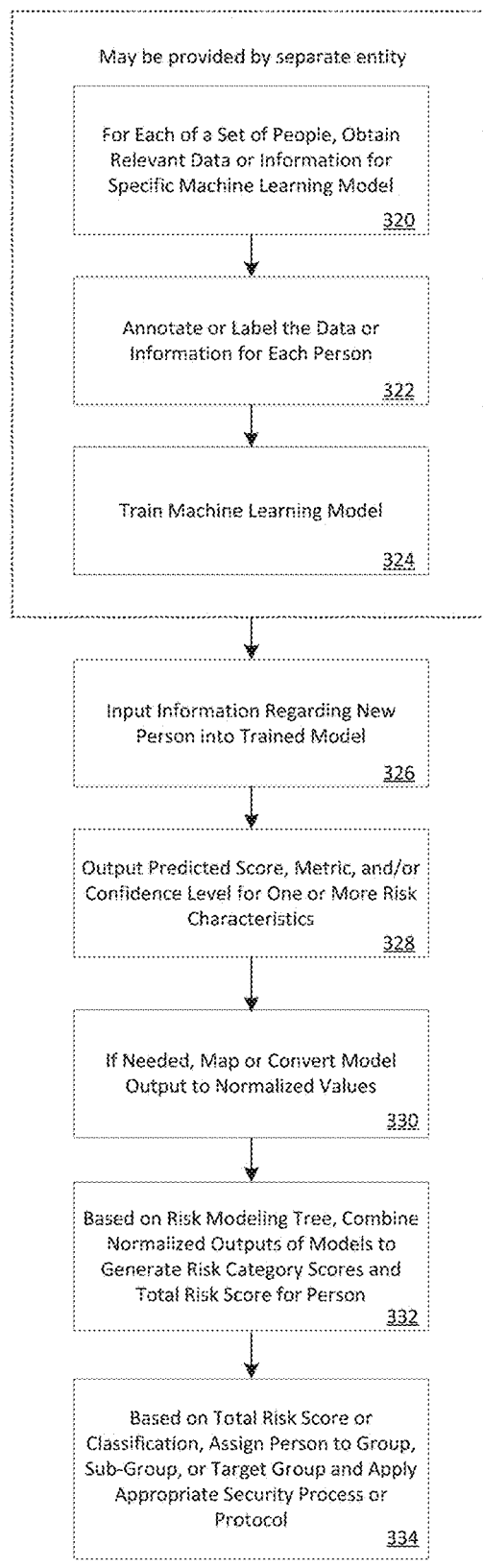
FIG. 3(d) is a flowchart or flow diagram illustrating a method, process, operation or function for determining a cybersecurity risk score, metric, or level of a person and in response setting an appropriate security policy or protocol for that person or for others in a similar group or segment, in accordance with embodiments of the systems and methods described herein.

FIG. 3(d) is a flowchart or flow diagram illustrating a method, process, operation or function 300 for determining a cybersecurity risk score, metric, or level of a person and in response setting an appropriate security policy or protocol for that person or for others in a similar group or segment, in accordance with embodiments of the systems and methods described herein. As shown in the figure, the process uses a trained machine learning model. This model may be provided by an outside entity or constructed and trained by an entity practicing the cybersecurity risk management processes described herein.

At step or stage 320, a set of training data is accessed and processed as needed. In one embodiment, the training data includes data or information regarding security product signals that are associated with each of a set of people. The people may be employees of a specific organization, in which case the data (or the part used for training) may be anonymized. The data regarding each person or employee may include one or more of the types mentioned herein (i.e., data or information relevant to the likelihood of being attacked and/or to the likelihood of an attack being successful). The training data also includes a label, annotation, or classification for each person or employee's set of data, where the label denotes the "correct" cybersecurity risk measure, level, category, or score (step or stage 322). The input data or information may depend on the specific risk factors or characteristics being determined by the model, e.g., the risk contribution represented by a leaf of the risk modeling tree and may include signals or data obtained from a security product. The label or annotation may depend on the specific risk factors or characteristics being determined by the model and the scale or format used to indicate relative or absolute risk for that risk contribution or factor.

The model is trained (step or stage 324) to respond to an input of data or information regarding a "new" person or employee and in response to generate an output representing a classification of the employee with regards to their cybersecurity risk. The classification or output of the model may be in the form of a score, a metric, a level, an assignment to a risk group (high risk, low risk, etc.), etc. The classification or model output may represent a risk measure for a person as a whole, for a specific category (e.g., Attacked, Privileged, or Vulnerable), or for a specific sub-category or risk contribution. Note that in some cases, the output of a model may need to be mapped, converted, transformed or otherwise processed to generate a normalized value that can be compared to and/or combined with other risk contributions.

In some cases, a trained ML Model may function to perform this normalization for security product signals and data.

Next, data or information for a new person or employee is obtained and processed (if necessary) before being input to the trained model (step or stage 326). The output of the trained model is a classification or scoring of the person or employee with regards to that person's or employee's cybersecurity risk or (depending on the model) risk characteristic (step or stage 328). Note that the model output may represent an overall risk classification or instead the risk score or level for a specific characteristic, with that characteristic being a factor considered in generating a total risk associated with a person. In some embodiments, the output of the model may be more than one such possible classification, each with its own confidence or probability level.

At step or stage 330, the model's output may be mapped, transformed, or converted to a normalized value so that it may be combined with the outputs of other models to determine a person's overall risk score of classification. This is an optional step and depends on the form of the outputs generated by each model used in the risk assessment. This mapping or conversion may be assisted by knowing how risk measure ranges for a model output correspond to different risk level categories. As mentioned, in some cases, a trained ML Model may function to perform this normalization for security product signals and data.

Next, at step or stage 332 the person or employee's overall cybersecurity risk score, metric, or profile may be determined. This may be the result of combining the risk scores or metrics for a plurality of risk contributions. Each risk contribution may be represented by a leaf of a risk modeling tree or similar data structure (an Ontology, network, graph, etc.). Based on the risk contributions (risk factors) and the relationship between the risk contributions and the higher-level risk groups of Attacked Persons, Vulnerable Persons, and Privileged Persons, the separate risk scores or metrics may be combined to generate a risk score for each of the primary groups (AP, VP, and PP). The combining may be the result of addition, weighting, filtering, thresholding, or other suitable methodology. Based on the score for a person for each of the primary groups or categories, they may be segmented into a sub-group and/or target group.

After determining a score or metric for each primary risk group or category, a total risk score or overall risk score for a person may be determined. The combining may be the result of addition, weighting, filtering, thresholding, or other suitable methodology. As described in greater detail in the Appendix, the scores or metrics may be combined in several different ways depending upon the needs of the security analyst or others evaluating the results. Based on the person or employee's group and overall risk scores or metrics, they may be assigned to, or segmented into, a specific group, sub-group, or target group as described herein. Based on the assigned group, sub-group, or target group, a specific security process or protocol may be applied (step or stage 334).

In some examples, the security process or protocol may involve one or more of generating alerts, blocking access to sites, filtering of posted information, preventing access to systems, websites, or data during certain times, review of on-line social network or other postings to remove company specific information, development of rules for employee use of social network sites, increased training, restrictions on the use of specific vendors or services, etc. Other possible security processes or protocols that may be applied include, but are not limited to or required to include:

Denying access from externally controlled networks, such as login from an internet café;
    Enforcing stronger identification protocols for an employee, such as multi-factor authentication (MFA);
    Setting a stricter security policy for an employee; or
    Configuring or tuning other security systems or products based on an employee's seniority and/or role function to tighten policies or configurations, such as a firewall policy limiting access to a site for employees with certain seniority or functional roles.

As mentioned, in some embodiments, the level or degree of risk that is determined for a person may be combined with that of other people to determine a risk level for a group, function, or role in an organization, as well as for an organization as a whole. This may help to identify organizations or groups of people within an organization that are more likely to be a target of a cybersecurity attack, are possible sources of information that should not be posted, etc. The risk level, score, or category for an organization or subset of employees may depend on the risk arising from multiple sources (as illustrated by the risk modeling tree of FIG. 2(*c*)).

Depending on the total risk level or on the values of the various contributions to the total risk level, a different set of risk remediation measures, procedures, or protocols may be applied. Thus, the system and methods described herein may be used to determine a risk prevention or reduction measure to apply to an individual employee, to a group of similarly classified employees, or to an organization as a whole.

Generally, embodiments as shown in the flowcharts or flow diagrams of FIGS. 3(*a*) and 3(*d*) illustrate aspects of a method, process, operation or function for:
    obtaining and processing signals and data obtained from security events or products;
    converting the signals and data into normalized measures of risk for a plurality of contributions to risk;
    combining the normalized measures in accordance with a specific Ontology or organizational structure;
    based on the combining, segmenting a set of people into risk groups, sub-groups, and target categories; and
    using the result of the segmenting to identify and apply an appropriate security policy or protocol to a person as a result of their membership in a specific group, sub-group or target group.

Figure 4:
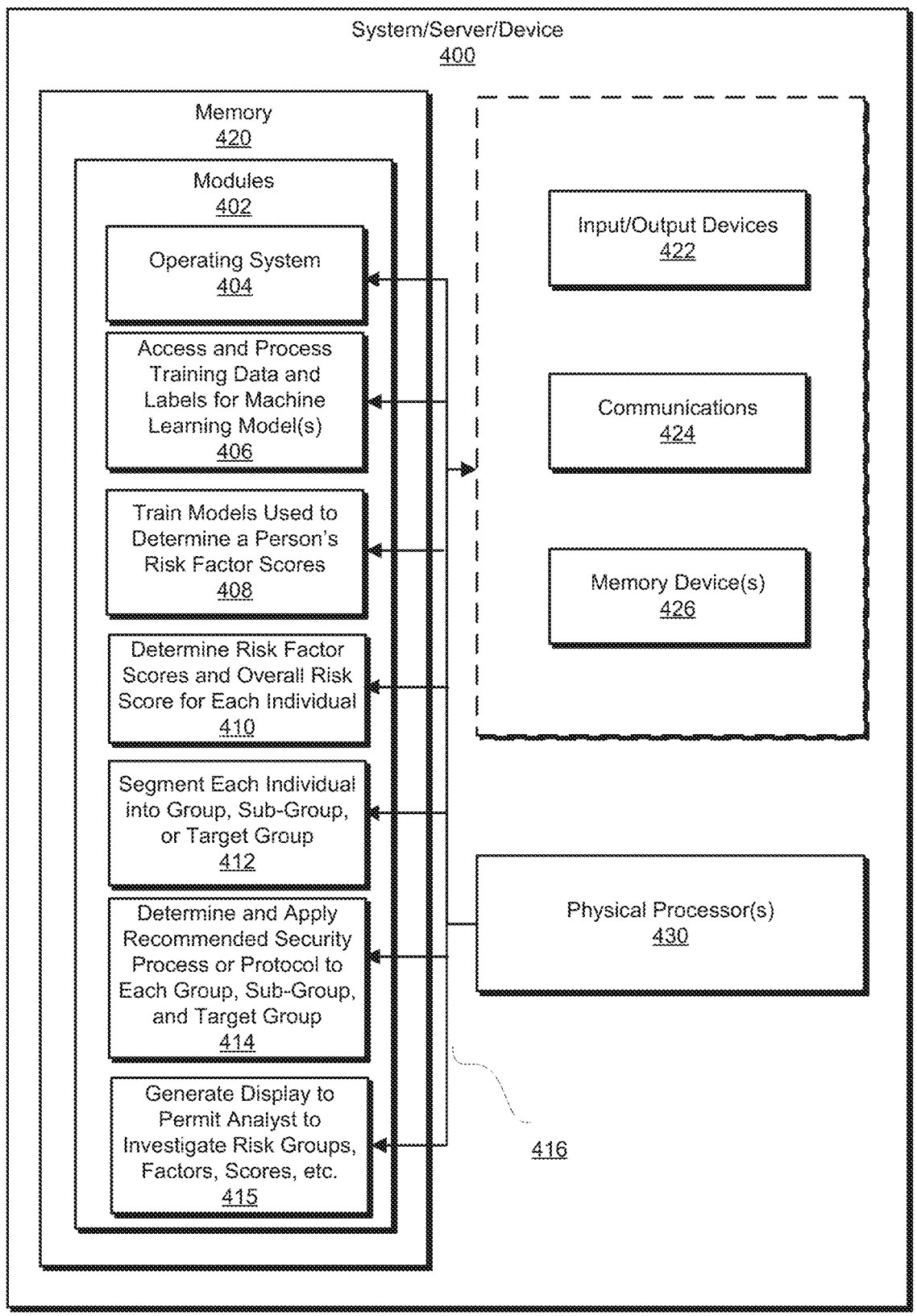
FIG. 4 is a diagram illustrating elements or components and concepts that may be present in a computing device, server, or system configured to implement a method, process, function, or operation in accordance with embodiments of the systems and methods described herein.

FIG. 4 is a diagram illustrating elements or components and concepts that may be present in a computing device, server, or system configured to implement a method, process, function, or operation in accordance with embodiments of the systems and methods described herein. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a specific function, method, process, or operation that is implemented by the module or sub-module. Such function, method, process, or operation may include those used to implement one or more aspects of the disclosed system and methods, such as for:

(a) for each of a set of people:
  (1) obtain data related to cybersecurity attacks, attempted attacks and other events or activities relevant to cybersecurity for that person from security products and threat monitoring services;
  (2)) obtain data regarding the person's title, role and responsibilities from a directory of employees and information about access privileges to sensitive systems and data from a privilege management system; and
  (3) obtain data regarding the person's cybersecurity training experiences and responses to real or simulated threat scenarios and information about user behavior, e.g., browsing behavior, computer usage;

(b) depending on the form of the unprocessed data or signals, convert, transform, or otherwise process the data and/or signals to generate a normalized, common or canonical format representing each of the contributions to the overall cybersecurity risk for the person:
  this may include processing the signals and/or data to identify one or more aspects or characteristics of a cybersecurity attack or attempted attack, of a vendor or product, of another risk factor or contribution to risk, etc.;
  the processing may include application of experience to convert a signal or data into a risk score or measure (in absolute or relative terms);
  the processing may include use of one or more trained machine learning models to transform raw data or signals into a risk score or measure;

(c) where applicable, input relevant data into one or more trained machine learning models (such as the model(s) described herein) to output one or more risk scores, measures, metrics, or levels corresponding to the input data associated with the person;

(d) combine the normalized scores or metrics for each risk contribution as indicated by the structure and organization of a risk modeling tree or other data structure to obtain a risk score or metric for the person for each of the primary risk categories (AP, VP, PP);
  combine the primary risk category scores to obtain a total or overall risk score for the person, where the combination may be performed based on a selected process, weighting, etc.;

(e) define and apply the applicable threshold or filtering values for membership in the sub-groups of Very Attacked People, Very Vulnerable People, and Very Privileged People, and based on those, if applicable, assign the person to the appropriate sub-group or sub-groups (i.e., VAP, VVP, VPP);

(f) based on assignment or segmentation into one or more of the sub-groups (VAP, VVP, VPP), determine if the person is a member of any of the target groups found from intersections of the sub-groups;

(g) allow a security analyst to select and apply an appropriate security process or protocol to the members of each group, sub-group, or target group;

(h) in addition to scoring and segmentation or assignment of each of the set of people in an organization (which may include all members or employees, those in a specific division, those working on a specific contract or project, etc.), determine one or more of:
  the number of people in each group, sub-group, and target group;
  the identity of each person in each group, sub-group, and target group;
  the total risk scores or measures of all of the people in each group, sub-group, and target group; and
  combine the total risk category scores for all of the people in each of the primary groups (AP, VP, PP) to obtain a total or overall risk score for the organization, where the combination may be performed based on a selected process, weighting;

(i) generate a display or user interface and enable a security analyst to investigate and evaluate the risk scores and contributions to risk for the organizational as a whole from a person, a subset of people, a risk group, sub-group, or target group within the organization;
  this may include providing selectable UI elements to enable an analyst to vary thresholds for sub-group membership, explore characteristics of a group (such as role, title, or other characteristic), sub-group, or target group, view contributions to the total risk score for a group, sub-group, or target group; and (j) allow the security analyst to apply an appropriate security process or protocol to the organization as whole.

In some embodiments, the display or user interface may illustrate one or more of the following security related aspects:
  A risk score for an organization, person or group of people;
  An activatable element to allow a user to investigate the components of the risk score and to understand how the score was calculated;
  An adjustable element to permit the user to adjust a threshold value that determines if a person will belong to a sub-group of a group; and
  An element to permit a user to select a set of data for use in training a model, where the model is used to classify a person or group of people.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, FIG. 4 is a diagram illustrating elements or components and concepts that may be present in a computing device, server, or system 400 configured to implement a method, process, function, or operation in accordance with embodiments of the systems and methods described herein. The computing device, server, or system 400 contains a set of modules 402, with each module containing executable instructions that when executed by an electronic processor implement a method, process, function, or operation in accordance with embodiments of the invention.

As shown in the figure, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

As shown in the figure, modules 402 may contain one or more sets of instructions for performing the methods described herein. These modules may include those illustrated but may also include a greater number or fewer number than those illustrated. For example, Access and Process Training Data and Labels for Machine Learning Model(s) Module 406 may contain instructions that when executed perform a process to obtain and process data and signals obtained from security products that are indicative of security risks, events, persons attacked, job titles and roles, etc. and prepare that data for use in training one or more machine learning models. This may include labeling or annotating sets of signals and data for each of a plurality of people.

Train Models Used to Determine a Person's Risk Factor Scores Module 408 may contain instructions that when executed perform a process to train one or more machine learning models, with each model generating a risk score or metric for a specific contribution to the cybersecurity risk associated with a person. Determine Risk Factor Scores and Overall Risk Score for Each Individual Module 410 may contain instructions that when executed perform a process to generate a risk measure or profile for each individual person whose data is input to the one or more trained models.

This may involve operating more than a single model to obtain a risk score or metric for a plurality of risk contributions, and then combining those risk contributions into scores or metrics for each of the primary risk groups, AP, VP, and PP in accordance with a risk modeling tree. In some cases, combining the scores may require performing a conversion or transformation process, such as mapping, transforming, thresholding, filtering, scaling, etc. Segment Each Individual into Group, Sub-Group, or Target Group Module 412 may contain instructions that when executed perform a process to use the risk scores for each of the primary groups and an overall risk score or metric for a person to segment them into an appropriate group or category as described herein (i.e., AP, PP, VP, VAP, VPP, VVP, and their overlapping target sub-groups or categories). Determine and Apply Recommended Security Process or Protocol to Each Group, Sub-Group, and Target Group Module 414 may contain instructions that when executed perform a process to assign or determine an appropriate security plan or process for the members of each segmented group and apply that security plan or process to each member of the group (or those to whom it had not previously been applied). Generate Display to Permit Analyst to Investigate Risk Groups, Factors, Scores, etc. Module 415 may contain instructions that when executed generate one or more displays or user interfaces (such as those shown in FIGS. 1(a), 2(a) and 2(b)) to permit a security analyst to view and interact with the risk scores, groups, sub-groups, etc. for a person, group, sub-group, or the organization as a whole.

Figure 5:
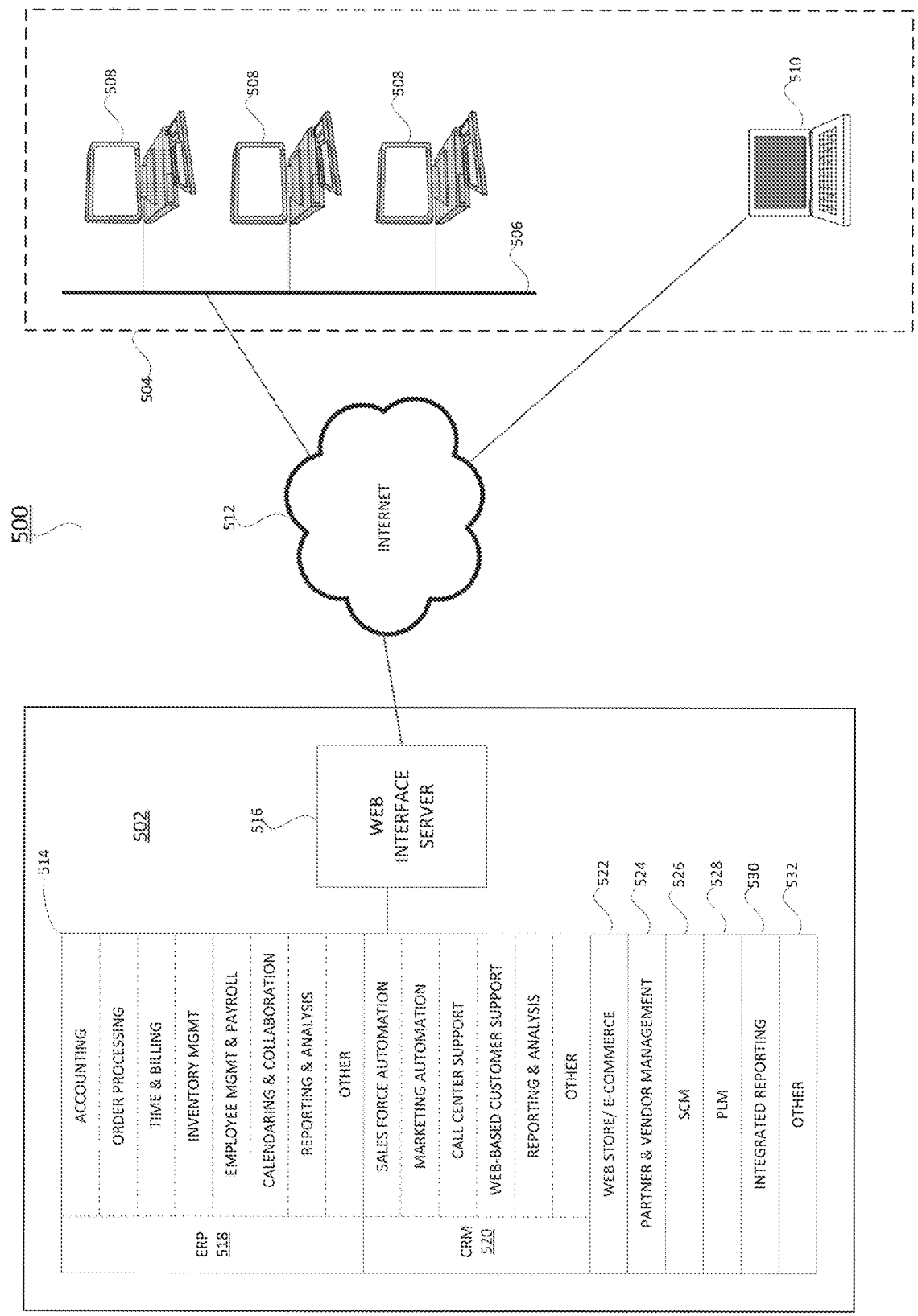
Figure 7:
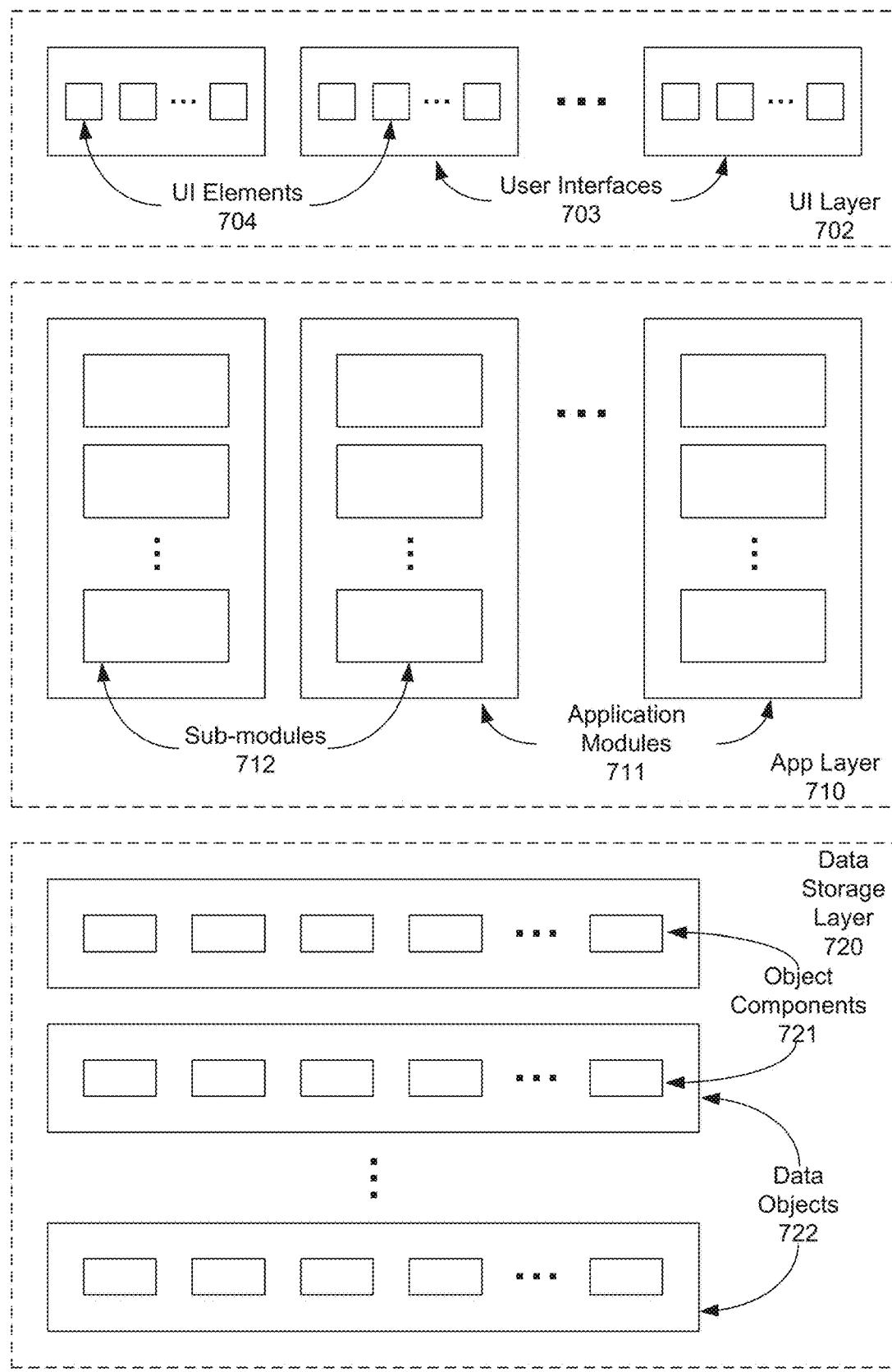

In some embodiments, the functionality and services provided by the system and methods described herein may be made available to multiple users, with each user having an account maintained by a server or server platform. Such a server or server platform may be termed a form of Software-as-a-Service (SaaS). FIG. 5 is a diagram illustrating a SaaS system, including an integrated business system and an enterprise network in which an embodiment of the invention may be implemented. FIG. 6 is a diagram illustrating elements or components of an example operating environment in which an embodiment of the invention may be implemented. FIG. 7 is a diagram illustrating additional details of the elements or components of the multi-tenant distributed computing service platform of FIG. 6, in which an embodiment of the invention may be implemented.

Note that although FIGS. 5-7 illustrate a multi-tenant or SaaS architecture for the delivery of ERP and CRM business-related applications and services to multiple accounts/users, such an architecture may also be used to deliver other types of data processing services and provide access to other business-related applications. For example, in the context of the present application, such an architecture may be used to provide email analysis and filtering services, network cybersecurity services, risk evaluation services, employee segmentation services, risk remediation services, etc. through access to one or more applications or models.

As noted, in some embodiments, aspects of the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 5-7. Note that embodiments of the invention may also be implemented in the context of other computing or operational environments or systems, such as for an individual business data processing system, a private network used with a plurality of client terminals, a remote or on-site data processing system, another form of client-server architecture, etc.

FIG. 5 is a diagram illustrating a system 500 in which an embodiment of the invention may be implemented. Enterprise network 504 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 504 is represented by an on-site local area network 506 to which a plurality of personal computers 508 are connected, each generally dedicated to a particular end user, such as a service agent or other employee (although such dedication is not required), along with an exemplary remote user computer 510 that can be, for example, a laptop computer, tablet computer, or smartphone of an employee having internet access through a public Wi-Fi access point, or other internet access method. The end users (consumers) associated with computers 508 and 510 may possess an internet-enabled smartphone or other electronic device (such as a PDA, tablet, laptop computer) having wireless internet access or other synchronization capabilities. Users of the enterprise network 504 interface with the integrated business system 502 across the Internet 512 or another suitable communications network or combination of networks.

Integrated business system 502, which may be hosted by a dedicated third party, may include an integrated business server 514 and a web interface server 516, coupled as shown in FIG. 5. It is to be appreciated that either or both of the integrated business server 514 and the web interface server 516 may be implemented on one or more different hardware systems and components, even though represented as singular units in FIG. 5.

In a typical example in which system 502 is operated by a third party for the benefit of multiple account owners/tenants, each of whom is operating a business, integrated business server 514 comprises a set of business-related application. These applications may include an ERP module 518 and further comprises a CRM module 520. In many cases, it will be desirable for the ERP module 518 to share methods, libraries, databases, subroutines, variables, etc., with CRM module 520. In some examples, ERP module 518 may be intertwined with CRM module 520 into an integrated Business Data Processing Platform (which may be single tenant but is typically multi-tenant).

The ERP module 518 may include, but is not limited to or required to include, a finance and accounting module, an order processing module, a time and billing module, an inventory management and distribution module, an employee management and payroll module, a calendaring and collaboration module, a reporting and analysis module, and other ERP-related modules and functionality (eCommerce, point of sales, product information management, demand/material requirements planning (MRP), purchasing, content management systems (CMS), professional services automation (PSA), human resources management, and employee calendaring and collaboration).

The CRM module 520 may include, but is not limited to or required to include, a sales force automation (SFA) module, a marketing automation module, a contact list module (not shown), a call center support module, a web-based customer support module, a reporting and analysis module, a returns management authorization module (RMA), a loyalty program support module, and other CRM-related modules. The integrated business server 514 (or multi-tenant data processing platform) further may provide other business functionalities including a web store/eCommerce module 522, a partner and vendor management module 524, and an integrated reporting module 530. An SCM (supply chain management) module 526 and PLM (product lifecycle management) module 528 may also be provided. Web interface server 516 is configured and adapted to interface with the integrated business server 514 to provide one or more web-based user interfaces to end users of the enterprise network 504.

The integrated business system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a distributed computing service/platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or computer components including computer servers and processors, and may perform various functions, methods, processes, or operations as determined by the execution of a software application or set of instructions. The data storage tier 624 may include one or more data stores, which may include a Service Data store 625 and one or more Tenant Data stores 626.

Each tenant data store 626 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

Distributed computing service platform 608 may be multi-tenant and service platform 608 may be operated by an entity to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted with reference to FIG. 5, such business information systems may include an Enterprise Resource Planning (ERP) system that integrates the capabilities of several historically separate business computing systems into a common system, with the intention of streamlining business processes and increasing efficiencies on a business-wide level. Such functions or business applications are typically implemented by one or more modules of software code/instructions that are maintained on and executed by one or more servers 622 that are part of the platform's Application Server Tier 620.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. Such functions or business applications are typically implemented by one or more modules of software code/instructions that are maintained on and executed by one or more servers 622 that are part of the platform's Application Server Tier 620.

In addition to ERP and CRM functions, a business information system/platform (such as element 608) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 622 that are part of the platform's Application Server Tier 620.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may be integrated and executed by a single code base accessing one or more integrated databases as necessary, forming an integrated business management system or platform.

As noted with regards to FIG. 5, the integrated business system shown in FIG. 6 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, where individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business-related data that is resident on the platform. The extension may be developed by the tenant or by a $3^{rd}$ pay developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Tenant customizations to the platform may include custom functionality (such as the capability to perform tenant or user-specific functions, data processing, or operations) built on top of lower-level operating system functions. Some multi-tenant service platforms may offer the ability to customize functions or operations at different levels of the service platform, from aesthetic modifications to a graphical user interface to providing integration of components and/or entire applications developed by independent third-party vendors. This can be very beneficial, since by permitting use of components and/or applications developed by third party vendors, a multi-tenant service can significantly enhance the functionality available to tenants and increase tenant satisfaction with the platform.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention.

In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing ERP, CRM, eCommerce or other functionality to a user of the platform). Such function, method, process, or operation may include those used to implement one or more aspects of the inventive system and methods, such as for one or more of the processes or functions described with reference to FIGS. 3(a), 3(d), and 4:

(a) for each of a set of people:
  (1) obtain data related to cybersecurity attacks, attempted attacks and other events or activities relevant to cybersecurity for that person from security products and threat monitoring services;
  (2) obtain data regarding the person's title, role and responsibilities from a directory of employees and information about access privileges to sensitive systems and data from a privilege management system; and
  (3) obtain data regarding the person's cybersecurity training experiences and responses to real or simulated threat scenarios and information about user behavior, e.g., browsing behavior, computer usage;
(b) depending on the form of the unprocessed data or signals, convert, transform, or otherwise process the data and/or signals to generate a normalized, common or canonical format representing each of the contributions to the overall cybersecurity risk for the person:
  this may include processing the signals and/or data to identify one or more aspects or characteristics of a cybersecurity attack or attempted attack, of a vendor or product, of another risk factor or contribution to risk, etc.;
  the processing may include application of experience to convert a signal or data into a risk score or measure (in absolute or relative terms);
  the processing may include use of one or more trained machine learning models to transform raw data or signals into a risk score or measure;
(c) where applicable, input relevant data into one or more trained machine learning models (such as the model(s) described herein) to output one or more risk scores, measures, metrics, or levels corresponding to the input data associated with the person;
(d) combine the normalized scores or metrics for each risk contribution as indicated by the structure and organization of a risk modeling tree or other data structure to obtain a risk score or metric for the person for each of the primary risk categories (AP, VP, PP);
  combine the primary risk category scores to obtain a total or overall risk score for the person, where the combination may be performed based on a selected process, weighting, etc.;
(e) define and apply the applicable threshold or filtering values for membership in the sub-groups of Very Attacked People, Very Vulnerable People, and Very Privileged People, and based on those, if applicable, assign the person to the appropriate sub-group or sub-groups (i.e., VAP, VVP, VPP);
(f) based on assignment or segmentation into one or more of the sub-groups (VAP, VVP, VPP), determine if the person is a member of any of the target groups found from intersections of the sub-groups;
(g) allow a security analyst to select and apply an appropriate security process or protocol to the members of each group, sub-group, or target group;
(h) in addition to scoring and segmentation or assignment of each of the set of people in an organization (which may include all members or employees, those in a specific division, those working on a specific contract or project, etc.), determine one or more of:
  the number of people in each group, sub-group, and target group;
  the identity of each person in each group, sub-group, and target group;
  the total risk scores or measures of all of the people in each group, sub-group, and target group; and
  combine the total risk category scores for all of the people in each of the primary groups (AP, VP, PP) to obtain a total or overall risk score for the organization, where the combination may be performed based on a selected process, weighting;
(i) generate a display or user interface and enable a security analyst to investigate and evaluate the risk scores and contributions to risk for the organizational as a whole from a person, a subset of people, a risk group, sub-group, or target group within the organization;
  this may include providing selectable UI elements to enable an analyst to vary thresholds for sub-group membership, explore characteristics of a group (such as role, title, or other characteristic), sub-group, or target group, view contributions to the total risk score for a group, sub-group, or target group; and
(j) allow the security analyst to apply an appropriate security process or protocol to the organization as whole.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further example environments in which an embodiment of the invention may be implemented in whole or in part include devices (including mobile devices), software applications, systems, apparatuses, networks, SaaS platforms, IaaS (infrastructure-as-a-service) platforms, NaaS (network-as-a-service) platforms, or other configurable components that may be used by multiple users for data entry, data processing, application execution, or data review.

The following provides a non-limiting example of a process flow for determining a Total Cybersecurity Risk Score. In the example, the categorization process is based on 3 types of main risks:
  Attacked Risk;
  Vulnerable Risk; and
  Privileged Risk Each user in a company or organization receives a different (independent) score for each one of the 3 main contributions to the overall risk. In addition, the user gets a general risk score which is being calculated from the Attacked, Vulnerable and Privileged risks.

Risk Model—Overview and Implementation

General Features for an Example Embodiment

Figure 8:
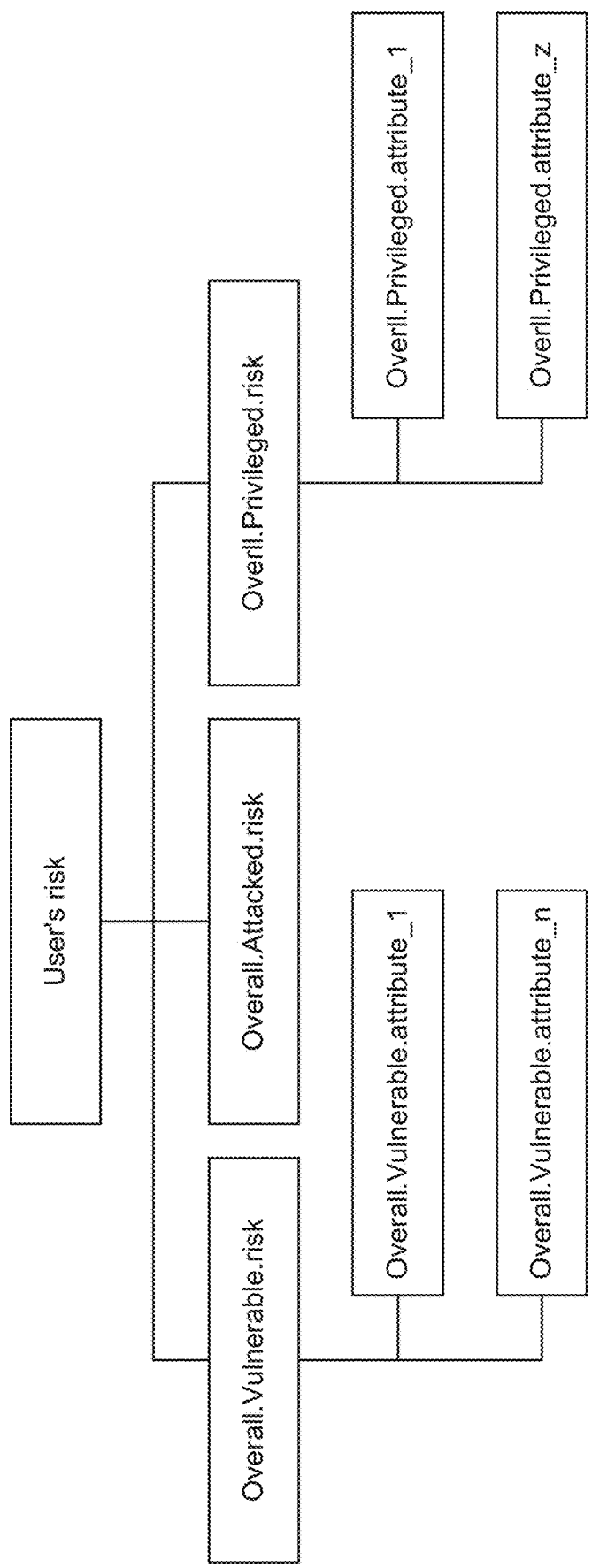
FIG. 8 is a diagram illustrating a portion of a risk tree.

The risk model is represented by a risk tree as disclosed and described herein;
FIG. 8 is an illustration of a partial risk tree;
Each user in the organization may be associated with its own risk tree;
The tree's root node is the user's general cybersecurity risk while its 3 children are the main risk components:
  Attacked Risk;
  Vulnerable Risk; and
  Privileged Risk
Each one of the 3 main risk components are based on the nodes below them (their respective children nodes);
In one example embodiment, each node (risk) in the tree can be assigned a risk score between 0 and 10;
The model structure is common to all customers of a given release;
The solution should support future extensions/updates for the risk model, for example: adding new branches beneath one of the Attacked, Privileged, or Vulnerable nodes;
The extension can be added by a new release to all customers;

As non-limiting examples. the risk value for each node can be determined in one of the following ways:
  Calculation—the risk score is calculated based on the value of its descendants in the risk tree;
  Fixed—the risk score will be determined by the system based on different attributes (residual risk) or manually by the customer via UI entries (based on knowledge and familiarity with a company);
  Dynamic risk—the node's value is set based on an attribute which is being extracted from data events. The risk score of the node is determined by a previously determined mapping, dictionary, heuristic, algorithm or rule-set.

Risk Calculation—an overview of the form and implementation of an example risk calculation The risks in the risk tree are typically calculated/determined every day based on the data records which were collected over the last 30 days (using a sliding window);
The risk score of different leaves might be calculated differently. In some embodiments, there are two types of aggregation functions:
  Sum—the risk score will be determined based on sum of the values of all the records of the same type (from the last 30 days); and
  Latest value—the risk score will be determined based on the value of the last relevant event which was received.

The assigned risk value of each internal node is calculated by a node's Risk formula:

$$NodeRisk = \max\left(\max(\text{children}), 10 * \frac{\text{sum (children)}}{\text{sum (children's MaxTheoreticalRisk)}}\right)$$

The quantity MaxTheoreticalRisk represents the maximum theoretical risk score which each one of a node's children can have.

Figure 9:
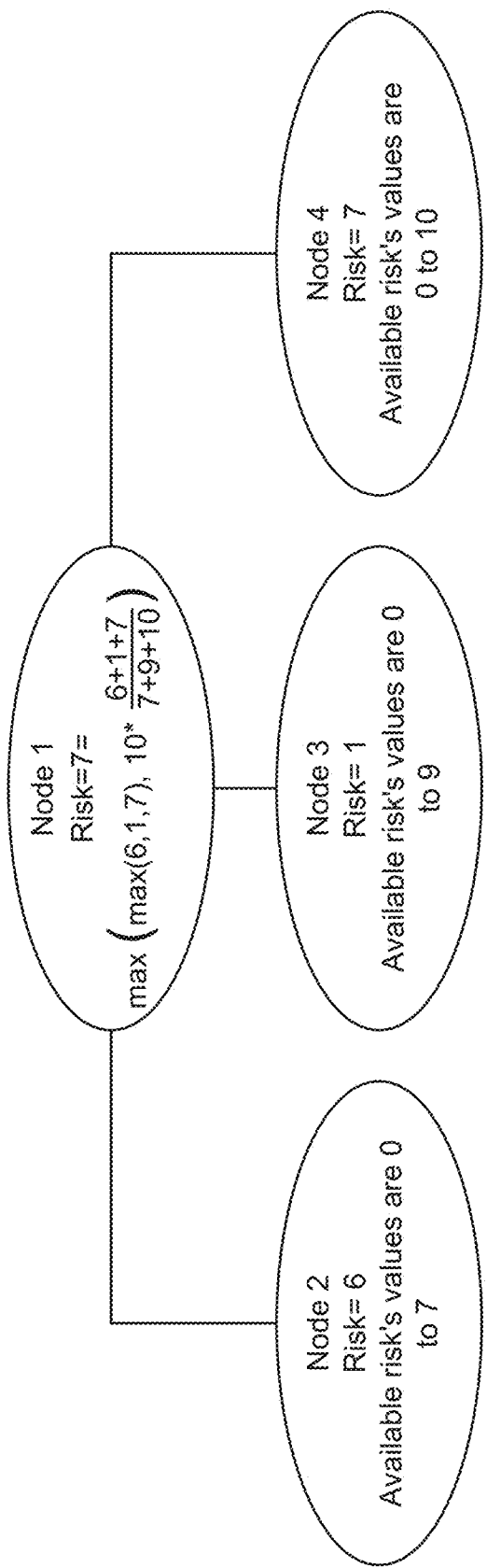
FIG. 9 is a diagram illustrating an example of a risk calculation based on node relationships.

An illustrative example of a risk calculation based on node relationships is shown in FIG. 9.

Further details regarding the risk calculation for each of the primary groups (Vulnerable, Privileged, and Attacked persons) are presented below, in accordance with some embodiments:

Vulnerable Person Risk Calculation
  User's Vulnerable risk score is calculated by the risk equation which was mentioned above based on the following attributes (nodes):
    Overall.Vulnerable.Behaviour.risk
    Overall.Vulnerable.Identity.risk
    Overall.Vulnerable.Environment.risk
    Overall.Vulnerable.Device.risk
Privileged Person Risk calculation
  User's Privileged risk score is calculated by the risk equation which was mentioned above based on the following attributes (nodes):
    Overall.Privileged.BusinessFunction.risk
    Overall.Privileged.VIP.risk
    Overall.Privileged.CustomPrivilegeGroup.risk
    Overall.Privileged.BusinessAuthority.risk
    Overall.Privileged.SensitiveSystems.risk Attacked Person Risk calculation Unlike vulnerable and privileged risks, attacked risk is calculated differently:

Attacked Risk values are in the range of [0-10]

Attacked Risk is calculated for the last 30 days

It should be possible to perform meaningful comparison of the current Attacked Risk value to the Attacked Risk value of one or more previous periods.

It should be possible to perform meaningful comparison of Attacked Risk values between different companies.

Meaningful comparison means that a higher attack index indicates higher attack index with comparable ratios between Attacked Risk value change and Attack Index change(s).

Attacked Risk Thresholds

Calculate Attacked Risk in such a way that for the global user population, the Attacked Risk values will have close to a logarithmic distribution Define the population with the risk values in such a way that 50% of the never-attacked employees have risk 0

25%—risk>=1

12.5%—risk>=2

0,999%—risk>=9

. . .

Figure 10:
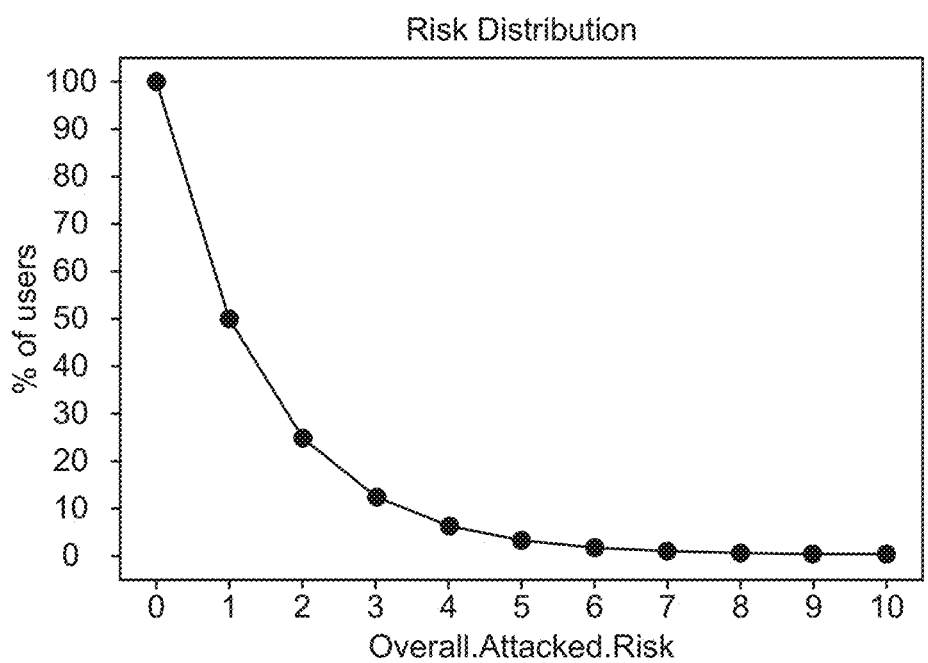
FIG. 10 is a graph illustrating an example risk distribution across a company or organization that is determined using an embodiment of the disclosed approach.

In general, for each attacked risk n, the percentage of people with risk higher or equal to n is $100\% * (1\frac{1}{2}^n)$ FIG. 10 is a graph illustrating an example risk distribution across a company or organization that is determined using an embodiment of the disclosed approach. In some embodiments, the following process flow may be implemented:

Calculate thresholds (T1, . . . , T10) of Attack Index value based on global population of users monitored by system;

Use those thresholds for determination of Attacked risk for each person; and

Below are example thresholds for Attacked risk calculation based on analysis of attacks

| Attack Index (X) Range | Attacked Risk |
|---|---|
| 0 | 0 |
| 0 < X <= 224 | 1 |
| 224 < X <= 567 | 2 |
| 567 < X <= 980 | 3 |
| 980 < X <= 1319 | 4 |
| 1391 < X <= 1792 | 5 |
| 1792 < X <= 2448 | 6 |
| 2448 < X <= 3110 | 7 |
| 3110 < X <= 4002 | 8 |
| 4002 < X <= 5053 | 9 |
| <5053 | 10 |

Below are illustrative examples of the indicated risk calculation(s), in accordance with an embodiment of the disclosure.

User's Risk calculation

User's risk may be calculated using the following equation:

$$User's\ risk = w_{vap} * \sqrt[3]{v*a*p} + w_{ap} * \sqrt{a*p} + w_{vp} * \sqrt{v*p} + w_{va} * \sqrt{v*a}$$

$w_{vap}$ = weight of averaging the Vulnerable, Attacked and Prvileged risks = 0.4

$w_{ap}$ = weight of averaging the Attacked and Prvileged risks = 0.3

$w_{vp}$ = weight of averaging the Vulnerable and Prvileged risks = 0.2

$w_{va}$ = weight of averaging the Vulnerable and Attacked risks = 0.1

Group/Sub-Group Risk

Group's (sub-group) risk score may be calculated by averaging the risk of users with the highest risk score in the company or group.

An average may be performed on all the users having a risk value equal to or greater than the risk's $90^{th}$ percentile value:

$$GroupRiskScore = \frac{\sum_{x=1}^{n} R_x}{n} \{R_x \geq P_{90}\}$$

$R_x$ = User'sRisk $P_{90}$ = Risk's 90th percentile value

Organizational Risk

Organizational risk value should be independent of the number of people in the organization and should depend on percentage of risky people.

Risk score values should be comparable between different organizations and different measurements.

Organizational risk may be calculated by applying Group Risk Score formula to all of an organization's users.

Residual Risk

A residual risk value can be set when a customer doesn't have one of the security products intended to be a source of the data and information used to determine a risk value.

In that case, the residual risk values will be added to certain nodes (and may be calculated by using a percentage of the default value of the residual risk).

In one embodiment, the initial scores of the residual risk terms may be set as:

Email Protection—8

Cloud protection—6

Security Awareness—3

Dynamic Risks

As was mentioned, a node's value is set based on one or more attributes extracted from data events. The risk score of the node may be determined by a predetermined source or process.

The default risk values in a dictionary or other source can be modified by a customer.

An example of a risk tree node description is shown in FIG. 11. The Risk Tree table in the figure describes the nodes (leaves/non-leaves) in an example risk tree, their aggregation/calculation type, available values, and residual risk.

in one example embodiment, the risk-related target groups may be determined as follows:

General

Each user can be part of the VAP, VVP & VPP groups simultaneously, however, they can belong only to one of the following groups: Imminent targets, Major targets, Latent targets or Soft targets.

In order to identify the VAP, VVP, and VPP groups, we calculate percentiles of all people by the relevant risk value (Attacked risk for VAP, Privilege risk of VPP, Vulnerable risk of VPP).

A user belongs to one or more of the VAP, VVP, and VPP groups if $$Rx > P_{90}$$

where $R_x$=User'sRisk $P_{90}$=Risk's 90th percentile value (this is a value chosen for purposes of an example and may be altered)

VAP—Very Attacked People

The VAP group contains all the users whose Attacked risk score is above the threshold.

The threshold is the Attacked risk $90^{th}$ percentile values and all users who have an attacked risk score above it, will be part of this group.

VVP—Very Vulnerable People

The VVP group contains all the users whose vulnerable risk score is above the threshold.

The threshold is the vulnerable risk $90^{th}$ percentile values and all the users who have a vulnerable risk score above it, will be part of this group.

VPP—Very Privileged People

The VPP group contains all the users whose privileged risk score is above the threshold.

The threshold is the privileged risk $90^{th}$ percentile values and all the users who have a privileged risk score above it, will be part of this group.

Imminent Targets

The imminent targets group contains users who are VAP, VPP & VVP together.

Major Targets

The Major targets group contains users who are both VAP & VPP & not VVP.

Latent Targets

The Latent targets group contains users who are both VPP & VVP

Soft Targets

The Soft targets group contains users who are both VAP & VVP.

Figure 12:
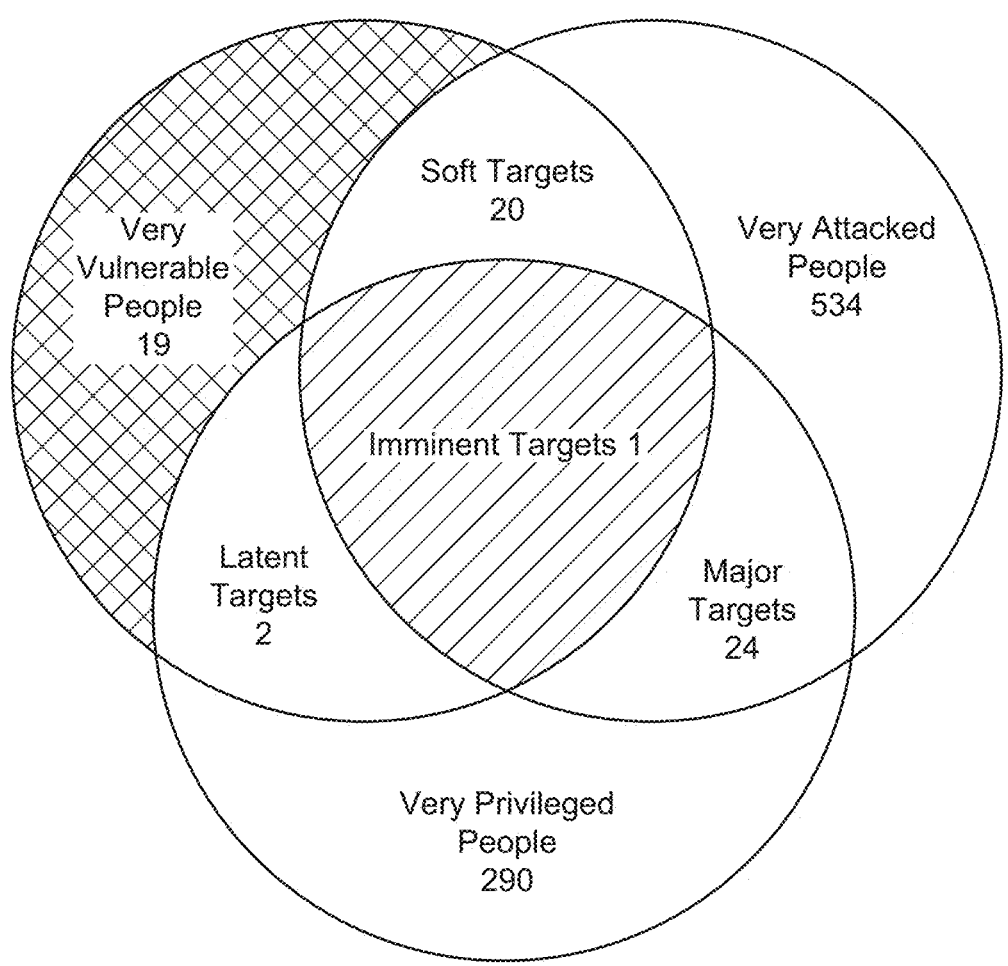
FIG. 12 is a Venn diagram illustrating the relationships and intersections between the various groups or categories of risk disclosed herein.

FIG. 12 is a Venn diagram illustrating the relationships and intersections between the various groups or categories of risk disclosed herein. Note the following when interpreting the example Venn diagram. The VAP, VVP, VPP group indicate not the total number of people in the respective group, but the number of people who belong only to the specific group. In the example diagram shown in FIG. 12, it is observed that:

19 people are very vulnerable, but neither very attacked nor very privileged;

290 people are very privileged, but neither very attacked nor very vulnerable;

534 people are very attacked, but neither very privileged nor very vulnerable.

The present disclosure includes the following numbered clauses:

Clause 1: A method of reducing the cybersecurity risk to an organization, comprising: for each person of a set of people, obtain data regarding attempted cybersecurity attacks directed at the person;

obtain data regarding the person's access to privileged or confidential information;

obtain data regarding the person's cybersecurity training experiences;

process the data to generate a normalized format representing a measure of each of a plurality of contributions to the overall cybersecurity risk for the person; combine one or more of the normalized measures to generate a total measure of the cybersecurity risk for the person for each of the risk categories of Attacked Persons, Vulnerable Persons, and Privileged Persons;

based on the total measure of the cybersecurity risk for the person for each of the categories of Attacked Persons, Privileged Persons, and Vulnerable Persons, determine if the person belongs to one or more of the sub-groups of Very Attacked People, Very Vulnerable People, and Very Privileged People;

determine if the person belongs to one or more target groups formed from an intersection of two or more of the sub-groups of Very Attacked People, Very Vulnerable People, and Very Privileged People;

generate a display or user interface showing a number of people in the set of people in each of the categories of Attacked Persons, Vulnerable Persons, and Privileged Persons, the sub-groups of Very Attacked People, Very Vulnerable People, and Very Privileged People, and the one or more target groups formed from an intersection of two or more of the sub-groups;

receive an input from a user to apply a specific cybersecurity process to each of the persons in one or more of each category, sub-group, or target group; and in response to the received input, apply the specific cybersecurity process to each of the persons in one or more of each category, sub-group, or target group.

Clause 2. The method of clause 1, wherein the data regarding attempted cybersecurity attacks directed at the person is obtained from one or more security monitoring products and the data regarding the person's access to privileged or confidential information is obtained from an employee directory or privilege management system.

Clause 3. The method of clause 1, wherein the data regarding the person's cybersecurity training experiences includes data regarding the person's cybersecurity training experiences and responses to real or simulated threat scenarios.

Clause 4. The method of clause 1, wherein processing the data to generate a normalized format representing a measure of each of a plurality of contributions to the overall cybersecurity risk for the person further comprises using a trained machine learning model to transform raw data into a risk score or measure for a specific contribution to risk.

Clause 5. The method of clause 1, wherein combining the one or more of the normalized measures to generate a total measure of the cybersecurity risk for the person for each of the categories of Attacked Persons, Vulnerable Persons, and Privileged Persons further comprises combining the measures as indicated by a risk modeling structure, the risk modeling structure representing the contributions to cybersecurity risk and their relationships to determining each of the risk categories.

Clause 6. The method of clause 5, wherein the risk modeling structure is a risk modeling tree.

Clause 7. The method of clause 1, wherein determining if the person belongs to one or more of the sub-groups of Very Attacked People, Very Vulnerable People, and Very Privileged People further comprises determining if the person's total measure of cybersecurity risk for each of the risk categories of Attacked Persons, Vulnerable Persons, and Privileged Persons exceeds a threshold value for the respective sub-group.

Clause 8. The method of clause 1, wherein generating a display or user interface further comprises generating a display or user interface including one or more selectable elements to enable the user to perform one or more of varying a threshold for sub-group membership, view or more characteristics of a group, sub-group, or target group, or view contributions to the total risk score for a group, sub-group, or target group.

Clause 9. The method of clause 8, wherein the display or user interface includes one or more of:
an activatable element to allow a user to investigate the components of a risk score and to understand how the score was calculated;
an adjustable element to permit the user to adjust a threshold value that determines if a person will belong to a sub-group of a group; and
an element to permit a user to select a set of data for use in training a model, where the model is used to classify a person or group of people.

Clause 10. The method of clause 1, wherein the specific cybersecurity process to each of the persons in one or more of each category, sub-group, or target group is one or more of:
denying access from externally controlled networks;
enforcing stronger identification protocols;
setting a stricter security policy for an employee; or
instituting a firewall policy limiting access to a specific website for employees having a specified seniority level or functional role.

Clause 11. A system for reducing the cybersecurity risk to an organization, comprising:
at least one electronic processor;
an electronic non-transitory data storage element including a set of computer-executable instructions that, when executed by the electronic processor, cause the system to
for each person of a set of people,
obtain data regarding attempted cybersecurity attacks directed at the person;
obtain data regarding the person's access to privileged or confidential information;
obtain data regarding the person's cybersecurity training experiences;
process the data to generate a normalized format representing a measure of each of a plurality of contributions to the overall cybersecurity risk for the person;
combine one or more of the normalized measures to generate a total measure of the cybersecurity risk for the person for each of the risk categories of Attacked Persons, Vulnerable Persons, and Privileged Persons;
based on the total measure of the cybersecurity risk for the person for each of the categories of Attacked Persons, Privileged Persons, and Vulnerable Persons, determine if the person belongs to one or more of the sub-groups of Very Attacked People, Very Vulnerable People, and Very Privileged People;
determine if the person belongs to one or more target groups formed from an intersection of two or more of the sub-groups of Very Attacked People, Very Vulnerable People, and Very Privileged People;
generate a display or user interface showing a number of people in the set of people in each of the categories of Attacked Persons, Vulnerable Persons, and Privileged Persons, the sub-groups of Very Attacked People, Very Vulnerable People, and Very Privileged People, and the one or more target groups formed from an intersection of two or more of the sub-groups;
receive an input from a user to apply a specific cybersecurity process to each of the persons in one or more of each category, sub-group, or target group; and
in response to the received input, apply the specific cybersecurity process to each of the persons in one or more of each category, sub-group, or target group.

Clause 12. The system of clause 11, wherein the data regarding attempted cybersecurity attacks directed at the person is obtained from one or more security monitoring products and the data regarding the person's access to privileged or confidential information is obtained from an employee directory or privilege management system.

Clause 13. The system of clause 11, wherein the data regarding the person's cybersecurity training experiences includes data regarding the person's cybersecurity training experiences and responses to real or simulated threat scenarios.

Clause 14. The system of clause 11, wherein processing the data to generate a normalized format representing a measure of each of a plurality of contributions to the overall cybersecurity risk for the person further comprises using a trained machine learning model to transform raw data into a risk score or measure for a specific contribution to risk.

Clause 15. The system of clause 11, wherein combining the one or more of the normalized measures to generate a total measure of the cybersecurity risk for the person for each of the categories of Attacked Persons, Vulnerable Persons, and Privileged Persons further comprises combining the measures as indicated by a risk modeling structure, the risk modeling structure representing the contributions to cybersecurity risk and their relationships to determining each of the risk categories.

Clause 16. The system of clause 15, wherein the risk modeling structure is a risk modeling tree.

Clause 17. The system of clause 11, wherein determining if the person belongs to one or more of the sub-groups of Very Attacked People, Very Vulnerable People, and Very Privileged People further comprises determining if the person's total measure of cybersecurity risk for each of the risk categories of Attacked Persons, Vulnerable Persons, and Privileged Persons exceeds a threshold value for the respective sub-group.

Clause 18. The system of clause 11, wherein generating a display or user interface further comprises generating a display or user interface including one or more selectable elements to enable the user to perform one or more of varying a threshold for sub-group membership, view or more characteristics of a group, sub-group, or target group, or view contributions to the total risk score for a group, sub-group, or target group.

Clause 19. The system of clause 18, wherein the display or user interface includes one or more of:
an activatable element to allow a user to investigate the components of a risk score and to understand how the score was calculated;
an adjustable element to permit the user to adjust a threshold value that determines if a person will belong to a sub-group of a group; and
an element to permit a user to select a set of data for use in training a model, where the model is used to classify a person or group of people.

Clause 20. The system of clause 11, wherein the specific cybersecurity process to each of the persons in one or more of each category, sub-group, or target group is one or more of:
denying access from externally controlled networks;
enforcing stronger identification protocols;
setting a stricter security policy for an employee; or
instituting a firewall policy limiting access to a specific website for employees having a specified seniority level or functional role.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions. The instructions may be stored in (or on) a non-transitory computer-readable medium and executed by a programmed processor or processing element. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision, classification, or value as an output.

In general terms, a neural network may be viewed as a system of interconnected artificial "neurons" that exchange messages between each other. The connections have numeric weights that are "tuned" or set during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a dataset of inputs in an assortment of representative input patterns that are associated with their intended output response (e.g., a label). Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as, for example, Java, JavaScript, Python, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method of reducing cybersecurity risk to an organization, comprising:
for each person of a set of people in an organization,
obtaining data regarding attempted cybersecurity attacks directed at the person;
obtaining data regarding the person's access to privileged or confidential information;
obtaining data regarding the person's cybersecurity training experience;
processing the obtained data to generate a normalized measure representing each of a plurality of contributions to a cybersecurity risk for the person;
combining one or more of the normalized measures to generate a total measure of the cybersecurity risk for the person for one or more risk categories, wherein the risk categories include Attacked Persons, Vulnerable Persons, and Privileged Persons;
based on the total measure of the cybersecurity risk for the person for the risk categories of Attacked Persons, Privileged Persons, and Vulnerable Persons, determining if the person belongs to one or more sub-groups of Very Attacked People, Very Vulnerable People, and Very Privileged People;
determining if the person belongs to one or more target groups formed from an intersection of two or more of the sub-groups of Very Attacked People, Very Vulnerable People, and Very Privileged People;
generating a display or user interface showing a plurality of people in the organization in each of the risk categories of Attacked Persons, Vulnerable Persons, and Privileged Persons, the sub-groups of Very Attacked People, Very Vulnerable People, and Very Privileged People, and the one or more target groups formed from an intersection of two or more of the sub-groups; and
for each of the plurality of people represented in the generated display or user interface
receiving an input from a user identifying a specific cybersecurity process to apply to each of the plurality of people; and
in response to the input received from the user, applying the specific cybersecurity process.

2. The method of claim 1, wherein the data regarding attempted cybersecurity attacks directed at the person is obtained from one or more security monitoring products and the data regarding the person's access to privileged or confidential information is obtained from an employee directory or privilege management system.

3. The method of claim 1, wherein the data regarding the person's cybersecurity training experience, includes data regarding the person's responses to real or simulated threat scenarios.

4. The method of claim 1, wherein processing the obtained data to generate a normalized measure representing each of a plurality of contributions to the cybersecurity risk for the person further comprises using a trained machine learning model to transform raw data into a risk score or measure for a specific contribution to cybersecurity risk.

5. The method of claim 1, wherein combining one or more of the normalized measures to generate a total measure of the cybersecurity risk for the person for the risk categories of Attacked Persons, Vulnerable Persons, and Privileged Persons further comprises combining the normalized measures as indicated by a risk modeling structure, the risk modeling structure representing contributions to cybersecurity risk and a relationship between one or more of the contributions and each of the risk categories.

6. The method of claim 5, wherein the risk modeling structure is a risk modeling tree.

7. The method of claim 1, wherein determining if the person belongs to one or more of the sub-groups of Very Attacked People, Very Vulnerable People, and Very Privileged People further comprises determining if the person's total measure of cybersecurity risk for each of the risk categories of Attacked Persons, Vulnerable Persons, and Privileged Persons exceeds a threshold value for membership in the respective sub-group.

8. The method of claim 1, wherein generating a display or user interface further comprises generating a display or user interface including one or more selectable elements to enable the user to perform one or more of varying a threshold for sub-group membership, viewing one or more characteristics of a group, sub-group, or target group, or viewing contributions to the total risk score for a group, sub-group, or target group.

9. The method of claim 8, wherein the display or user interface includes one or more of:
   an activatable element to allow the user to investigate the components of a risk score and to understand how the score was calculated;
   an adjustable element to permit the user to adjust a threshold value that determines if a person will belong to a sub-group of a group; and
   an element to permit a user to select a set of data for use in training a model, where the model is used to classify a person or group of people into a group, sub-group, or target group.

10. The method of claim 1, wherein the specific cybersecurity process to apply is one or more of:
    denying access from externally controlled networks;
    enforcing stronger identification protocols;
    setting a stricter security policy; or
    instituting a firewall policy limiting access to a specific website for persons having a specified seniority level or functional role.

11. A system for reducing cybersecurity risk to an organization, comprising:
    at least one electronic processor;
    an electronic non-transitory data storage element including a set of computer-executable instructions that, when executed by the electronic processor, cause the system to
    for each person of a set of people in an organization,
        obtain data regarding attempted cybersecurity attacks directed at the person;
        obtain data regarding the person's access to privileged or confidential information;
        obtain data regarding the person's cybersecurity training experiences;
        process the obtained data to generate a normalized measure representing each of a plurality of contributions to a cybersecurity risk for the person;
        combine one or more of the normalized measures to generate a total measure of the cybersecurity risk for the person for each of one or more risk categories, wherein the risk categories include Attacked Persons, Vulnerable Persons, and Privileged Persons;
        based on the total measure of the cybersecurity risk for the person for the one or more risk categories of Attacked Persons, Privileged Persons, and Vulnerable Persons, determine if the person belongs to one or more sub-groups, wherein the sub-groups include Very Attacked People, Very Vulnerable People, and Very Privileged People;
        determine if the person belongs to one or more target groups formed from an intersection of two or more of the sub-groups of Very Attacked People, Very Vulnerable People, and Very Privileged People;
    generate a display or user interface showing a plurality of people in the organization in each of the risk categories of Attacked Persons, Vulnerable Persons, and Privileged Persons, the sub-groups of Very Attacked People, Very Vulnerable People, and Very Privileged People, and;
    for each of the plurality of people represented in the generated display or user interface
    receive an input from a user identifying a specific cybersecurity process to apply to each of the plurality of people; and
    in response to the input received from the user, apply the specific cybersecurity process.

12. The system of claim 11, wherein the data regarding attempted cybersecurity attacks directed at the person is obtained from one or more security monitoring products and the data regarding the person's access to privileged or confidential information is obtained from an employee directory or privilege management system.

13. The system of claim 11, wherein the data regarding the person's cybersecurity training experiences includes data regarding the person's responses to real or simulated threat scenarios.

14. The system of claim 11, wherein processing the data to generate a normalized measure representing each of a plurality of contributions to the cybersecurity risk for the person further comprises using a trained machine learning model to transform raw data into a risk score or measure for a specific contribution to cybersecurity risk.

15. The system of claim 11, wherein combining one or more of the normalized measures to generate a total measure of the cybersecurity risk for the person for the risk categories of Attacked Persons, Vulnerable Persons, and Privileged Persons further comprises combining the normalized measures as indicated by a risk modeling structure, the risk modeling structure representing contributions to cybersecurity risk and a relationship between one or more of the contributions and each of the risk categories.

16. The system of claim 15, wherein the risk modeling structure is a risk modeling tree.

17. The system of claim 11, wherein determining if the person belongs to one or more of the sub-groups of Very Attacked People, Very Vulnerable People, and Very Privileged People further comprises determining if the person's total measure of cybersecurity risk for each of the risk categories of Attacked Persons, Vulnerable Persons, and Privileged Persons exceeds a threshold value for membership in the respective sub-group.

18. The system of claim 11, wherein generating a display or user interface further comprises generating a display or user interface including one or more selectable elements to enable the user to perform one or more of varying a threshold for sub-group membership, viewing or more characteristics of a group, sub-group, or target group, or viewing contributions to the total risk score for a group, sub-group, or target group.

19. The system of claim 18, wherein the display or user interface includes one or more of:
- an activatable element to allow the user to investigate the components of a risk score and to understand how the score was calculated;
- an adjustable element to permit the user to adjust a threshold value that determines if a person will belong to a sub-group of a group; and
- an element to permit a user to select a set of data for use in training a model, where the model is used to classify a person or group of people into a group, sub-group, or target group.

20. The system of claim 11, wherein the specific cybersecurity process to apply is one or more of:
- denying access from externally controlled networks;
- enforcing stronger identification protocols;
- setting a stricter security policy; or
- instituting a firewall policy limiting access to a specific website for persons having a specified seniority level or functional role.

* * * * *